United States Patent
Buxton et al.

(10) Patent No.: US 6,469,714 B2
(45) Date of Patent: *Oct. 22, 2002

(54) INFOCENTER USER INTERFACE FOR APPLETS AND COMPONENTS

(75) Inventors: Jeffrey J. Buxton, Andover; Charles E. Grindel, Millis; Jennifer L. Pinkus, Milton; Jonathan P. Booth, Portsmouth; Douglas J. Wilson, Concord, all of MA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,520

(22) Filed: Dec. 29, 1998

(65) Prior Publication Data

US 2002/0089526 A1 Jul. 11, 2002

Related U.S. Application Data

(60) Provisional application No. 60/072,576, filed on Jan. 26, 1998, and provisional application No. 60/072,577, filed on Jan. 26, 1998.

(51) Int. Cl.$^7$ ................................................. G09G 5/00
(52) U.S. Cl. ........................ 345/762; 345/744; 707/102
(58) Field of Search ................................. 345/333, 334, 345/340, 967, 335, 762, 765, 781, 744; 717/1, 101, 120; 707/101, 102, 103

(56) References Cited

U.S. PATENT DOCUMENTS

| | | | | |
|---|---|---|---|---|
| 5,786,815 A | * | 7/1998 | Ford | 345/762 |
| 5,842,020 A | * | 11/1998 | Faustini | 717/1 |
| 5,937,064 A | * | 8/1999 | Eick et al. | 707/101 |
| 5,978,579 A | * | 11/1999 | Buxton et al. | 717/1 |
| 5,991,534 A | * | 11/1999 | Hamilton et al. | 717/1 |
| 6,005,568 A | * | 12/1999 | Simonoff et al. | 345/744 |
| 6,064,382 A | * | 5/2000 | Diedrich et al. | 345/335 |
| 6,073,163 A | * | 6/2000 | Clark et al. | 709/203 |

\* cited by examiner

*Primary Examiner*—Raymond J. Bayerl
*Assistant Examiner*—Tadesse Hailu
(74) *Attorney, Agent, or Firm*—Kudirka & Jobse, LLP

(57) ABSTRACT

A mechanism for generating customized graphical user interfaces for applications in an object-oriented environment is disclosed. Such applications may comprise Java beans, applets or components. The graphic user interface comprises a visual user interface, e.g. an action bar which contain a set of buttons and menus as well as a set of widget and property/command panels, as well as a communication interface through which configuration and user responses are exchanged with the applications. The relationship between the graphic user interface and an applet is based on the applet communicating selection and user interface information to the graphic user interface, and the graphic user interface handling the user gestures by calling methods on specific interfaces of the applet. Communications between the graphic user interface and applets occur over an information bus architecture referred to as the InfoBus.

21 Claims, 15 Drawing Sheets

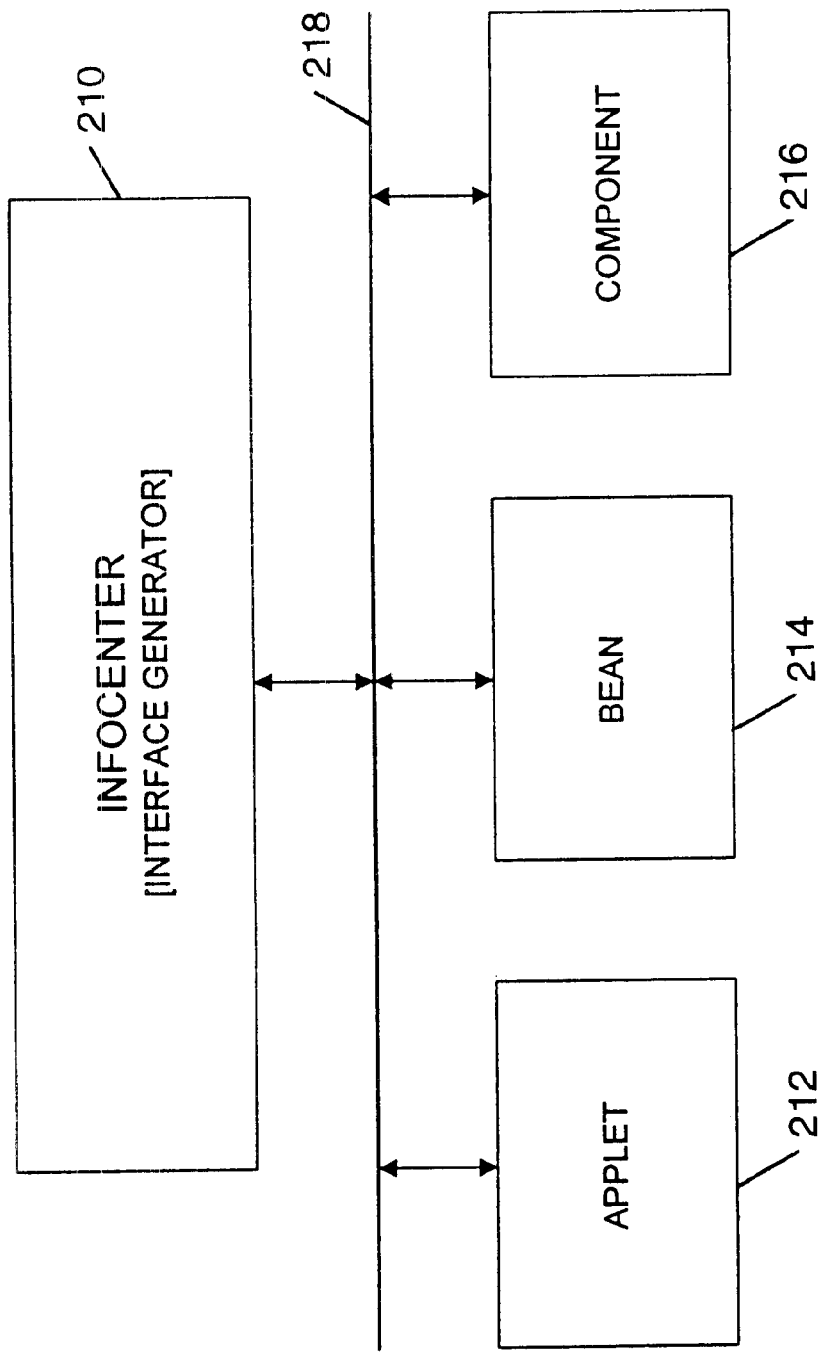

INFOCENTER USER INTERFACE FOR APPLETS AND COMPONENTS

RELATED APPLICATIONS

This application is the one of five U.S. patent applications filed on an even date herewith and commonly assigned, including:

Ser. No. 09/222,489, by Douglas J. Wilson et. al., entitled "Method and System for Communicating Information Among Interactive Applications";

Ser. No. 09/222,201, by Douglas J. Wilson et. al., entitled "Method and System for Controlling Data Acquisition Over and Information Bus";

Ser. No. 09/222,494, by Douglas J. Wilson, et al., entitled "Method and System for Retrieving Data Over an Information Bus"; and Ser. No. 09/222,467, by Douglas J. Wilson et. al., entitled "Method and System for Distributing Data Events Over an Information Bus".

FIELD OF THE INVENTION

This invention relates generally to improvements in computer systems, and, more particularly, to a user interface for use with computer systems.

BACKGROUND OF THE INVENTION

Numerous advances have been made recently to simplify the manner in which users interact with computer systems. For example, graphic user interfaces (GUI) have been created to provide visually intuitive means of interacting with a computer. In particular, GUIs such as that available in the Workplace Shell, part of the OS/2® operating system, commercially available from IBM Corporation, Boca Raton, Fla., and Windows GUI for the DOS operating system, commercially available form, Microsoft Corp., Redmond Wash., enable users to process and store data using graphic metaphors which resemble real life objects. Such interfaces have vastly reduced the level of sophistication and experience necessary for users to interact in a meaningful manner with the computer system and, accordingly, have increased user productivity.

Such graphic user interfaces, referred to hereinafter as legacy GUIs, are somewhat static in their format and do not readily adjust to a user's task very well. As a result, applications are designed to work with the limits of the graphic user interface, rather than the graphic user interface configuring itself to the task performed by an application.

One of the major developments in the field of software design has been the emergence of object-oriented technology. As explained in greater detail hereinafter, object-oriented technology enables the analysis, design and implementation of software systems with intelligent, autonomous agents called objects. Such objects facilitate the design of modular software which more closely mimics the physical or logical entities within the real world.

One of the more recent developments in object-oriented programming is the Java® programming language developed by Sun Microsystems, Mountain View, Calif. The Java programming language is an object-oriented language, having many elements in common with the C programming language and C++ programming language, with additional modifications. The Java programming language has the benefits of an interpreted language in the performance of compiled code. To enable Java applications to execute on a computer network, a compiler generates an architecture-neutral object file format, i.e. the compiled code is executable on many processors, given the presence of the Java-run time system.

The Java languages enables developers to write custom applications called Java applets. When integrated into webpages delivered over the Internet, Java applets allow expert graphics rendering, real-time interaction with users, live information updating and full use of multimedia and instant interaction with servers over a computer network.

The Java language and environment, including the JavaBeans specification provide mechanisms for the creation and management of small components whose function represent the building block to use in applications such as web applications. The term component as used in the specification, refers to a Java component which participates in a class definition and has a user interface.

Object-oriented environments, such as the Java virtual machine (JVM) environment, facilitate the design of beans or applets, useful in a network environment. In a network environment much of the functionality of applications is stored not on the actual user's computing platform but is accessible through a computer network such as a LAN or a public network such as the Internet. As a result, there is a current trend for reducing the complexity not only of applications and computer hardware architectures but also the interfaces used for computers which operate in a network environment. Accordingly, the legacy graphic user interfaces used with prior computer architectures and operating systems are not suitable for use with the emerging field of network computers (NC) and applications such as beans or applets which execute thereon.

A need exists, therefore, for a user interface which interacts with object-oriented applications, particularly in the JVM environment, which is capable of dynamically adapting itself to the specific interface requirements of an applet.

A need further exists for a user interface that is suitable for use with network computers and the dynamics of distributed computing and data communications in a network environment.

SUMMARY OF THE INVENTION

The present invention provides a mechanism for adding graphical user interfaces to applications in an object-oriented environment. Such applications may comprise Java beans, applets or components. The inventive graphic user interface referred to hereinafter as InfoCenter comprises a visual user interface, e.g. an action bar which contain a set of buttons and menus as well as a set of widget and property/command panels, as well as a communication interface through which configuration and user responses are exchanged with applets. The relationship between the InfoCenter and an applet is based on the applet communicating selection and user interface information to the InfoCenter, and the InfoCenter handling the user gestures by calling methods on specific interfaces of the applet. In the present invention communications between the InfoCenter and applets occur over an information bus architecture referred to as the InfoBus, as described hereafter.

According to one embodiment of the invention, a method for dynamically generating a user interface in a network computer environment comprises the steps of receiving an announcement of an object selection from an applet, querying the selection object for a user interface description, displaying an action bar graphically based on the user interface description, and responding to user selections. The user interface may display additional panels or pop up graphic entities in response to selection of a button or menu item by a user. In response to a user's selection to alter a property of the applet or send a command to the applet, the user interface calls the appropriate method of the class specified in the user interface description supplied by the applet. Utilizing these interfaces, applications may dynamically configure the InfoCenter user interface with their own user interface descriptions and the user interface response to user input and calls the available methods described in the user interface description.

BRIEF DESCRIPTION OF THE DRAWINGS

The above and other features, objects and advantages of the invention will be better understood by referring to the following detailed description in conjunction with the accompanying drawing in which:

FIG. 2 is a conceptual diagram of the elements comprising the user interface in accordance with the present invention;

DETAILED DESCRIPTION

Figure 1:
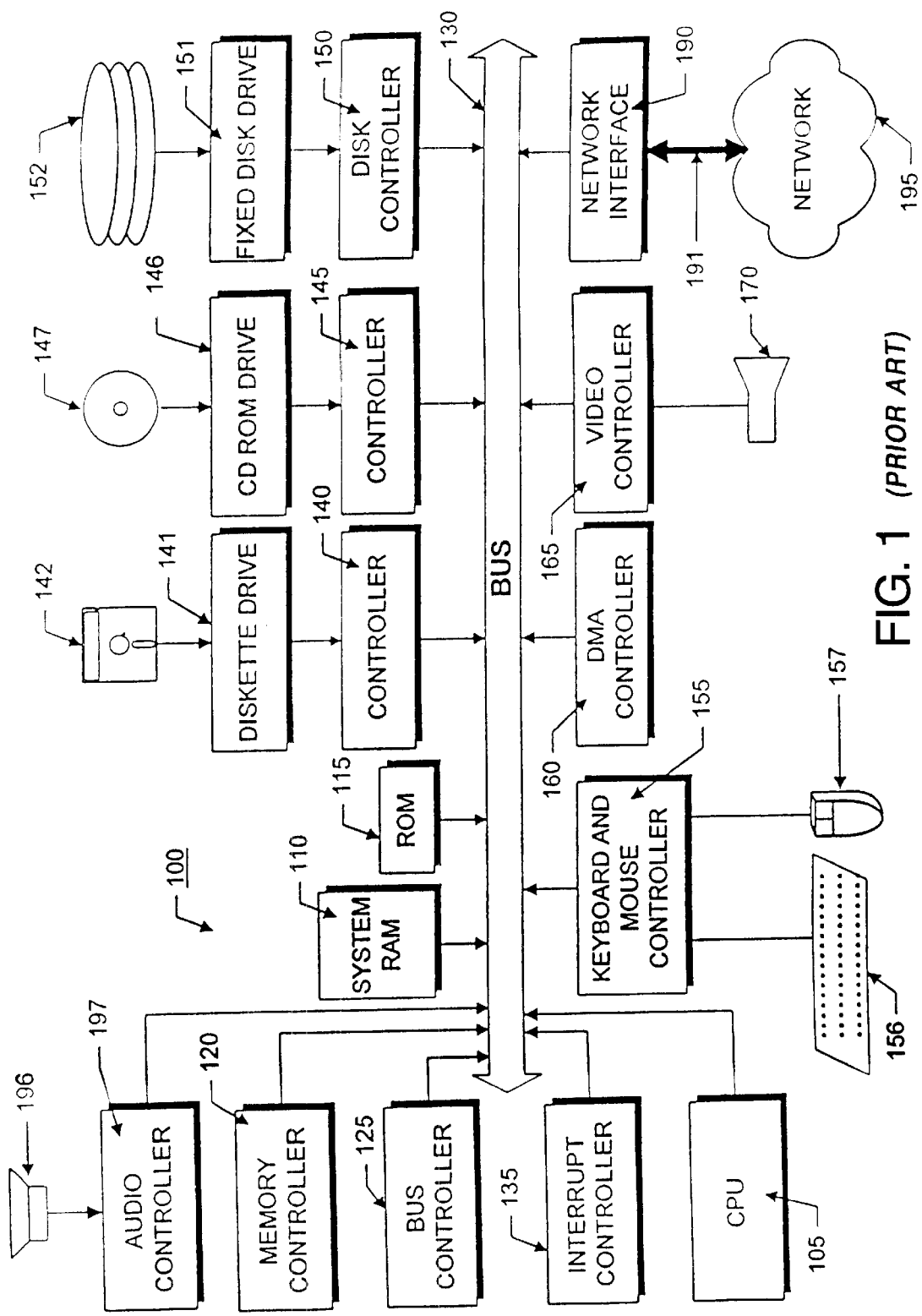
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. or Windows 95 from Microsoft Corp., Redmond, Wash. The operating system controls allocation of system resources and performs tasks such as processing scheduling, memory management, networking, and I/O services, among things. In particular, the operating system resident in system memory and running on CPU 105 coordinates the operation of the other elements of computer system 100. The present invention may be implemented with any number of commercially available operating systems including OS/2, UNIX Windows NT and DOS, etc. One or more applications 202, such as Lotus eSuite, commercially available from Lotus Development Corp., Cambridge, Mass., may be executable under the direction of operating system.

In the illustrative embodiment, the elements of InfoCenter GUI are implemented using an object-oriented programming language and, such as the Java programming language techniques. The Java language is well-known and many articles and texts are available which describe the language in detail. In addition, Java compilers are commercially available from several vendors including Sun Microsystems, Inc., Mountain View, Calif. Accordingly, for reasons of clarity, the details of the Java language the Java Virtual Machine. environment and the operation of a Java compiler will not be discussed further in detail herein, however, a brief overview of object-oriented programming is set hereafter for the reader's benefit. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime, memory is allotted and data structures are created.

The principle benefits of object-oriented programming techniques arise out of three basic principles; encapsulation, polymorphism and inheritance. More specifically, objects can be designed to hide, or encapsulate, all, or a portion of, their internal data structures and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. In this example, polymorphism allows three separate function definitions to be written, one for each type of variable, e.g., numbers, characters and dollars. After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare relationships among classes and the objects which are later created from those classes. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form. Overriding or modification does not alter the function in the base class, but merely modifies the use of the function in the subclass. The creation of a new subclass which has some of the functionality, with selective modification of another class allows software developers to easily customize existing code to meet their particular needs.

InfoCenter Architecture

As used in this document, the following terms have the meaning set forth below. The term "Desktop" refers to the complete user interface displayed on a computer display terminal of which the InfoCenter may be an integral part thereof. The term "Focus" refers to the area of a document where the users input will be applied, e.g. the place at which .the cursor was last set. The term "Widget" refers to a. generic control element, such as a graphic button, slider, or other potentiometer utilized in the panel of a graphic user interface. The term "InfoCenter" refers to the user interface, including any associated menus, action bar, panels for the inventive architecture of the present invention. The term "Action Bar" refers to the area of the InfoCenter that provides quick access to the most commonly used applet features, as well as access to menus. The term "Action Item" refers to a hot-spot on the action bar that provides single-click access to a command or action. The term "Quick Item" refers to a pop-up palette of choices from an action bar item. The term "Main Menu Item" refers to a hot-spot on the action bar or menu item that provides access to a pop-up textual menu. The term "Menu Bar" refers to a sliding bar that overlays a portion of the standard action bar with additional menu access. The term "Pop-Up Panel" refers to a panel that results from performing an action that requires additional user input or assistance, or, a panel that displays the full properties for the selective object, as well as multiple tabs in the event that there are too many properties to be displayed on a single panel. The term "Tab" refers to a panel for sub-categorized properties in a property panel. The term "Status Bar" refers to an area supplied by the network computer desktop to which applets can post messages such as "new mail received", "mail sent", and "connecting to server".

FIG. 2 is a block diagram depicting an InfoCenter 210, which is communicatively coupled to an assortment of applications 212–216. The applications include, for example, a Java applet 212, a Java bean 214, and a component 216. The number of applications is not duly limited, nor must there be at least one each of the applet 212, bean 214, or component 216. Rather, an assortment of such applications are allowed to interact with the InfoCenter 210 when used to generate a customized graphic user interface. The InfoCenter 210 and applications 212–216 communicate one with another via communications bus 218, which is an InfoBus and operations according to the protocol described in the InfoBus section below. InfoCenter 210 serves as a user's interface generator to produce customized GUI's based on a designer's input as selected from features available to the designer.

FIGS. 3A–D illustrate screen captures of an implementation of the InfoCenter in accordance with the present invention. FIG. 3 illustrates a Desktop 300 of which the InfoCenter 320 is displayed thereon. InfoCenter 320 comprises Action Bar 322, containing a number of Action Items 324 and main Menu items 326. Selection of a Main Menu item 326 results in a Pop-Up Menu of Quick-pick items 328. Quick-pick items 328 appear in a Pop-Up palette 330 of choices from Action Bar 322.

FIGS. 4A–D illustrate screen captures of an implementation of the InfoCenter in accordance with the present invention as displayed in a web browser environment. FIG. 4 illustrates a desktop 300 of which the InfoCenter 320 is displayed thereon. InfoCenter 320 comprises the action bar 322, which contains a number of action items 324 and main menu items 326. The desktop 300 is essentially the same as that of the desktop 300 of FIG. 3A–D and has corresponding features using the same numbering. One addition is a URL window 410 that is utilized for entering URL information, file information, or other data retrieval pointing information as desired by the user. The remaining items illustrated in FIGS. 4A–D are the same as those described in detail with respect to FIGS. 3A–D.

The InfoCenter provides a full UI access to all commands and properties of applets including combined action bar menu access and pop-up panels. The InfoCenter user interface fits on a network computer desktop, e.g. at the bottom, but may be designed to float or be repositioned on the desktop. Action items 324 that toggle on or off show the current status of the selected object. Examples include Bold, Italic, and Show/Hide Drawing Tools in the Presentation Graphics applet. If the selection contains mixed properties, the state based on the settings at the beginning of the selection may be shown.

InfoCenter Elements

The action bar 322 exposes and provides one-click access to the most common applet features of an applet. It also provides access to menus. Different action bar items may produce different behaviors, such as:

1. initiating an action with a single click, such as Cut or Bold;
2. displaying access to a palette of specific settings, such as a color palette or alignment options;
3. launching the user into a specific task, such as the scheduling of a meeting or the invitation of guests in a calendar applet;
4. presenting an entire properties or command panel, such as Save, or Print;
5. providing access to menus.

To ensure that each applet's action bar items fits within the desired size available on the desktop, a translation table for the names of commands for each applet may be produced for use with international products requiring translations of command names.

In the contemplated embodiment, each applet is responsible for ensuring that the standard English version of the action bar accommodates all supported languages, which typically requires more width. The action bar is context sensitive, allowing context switching within applets. The different contexts, as well as actions available within each context, are specified in the individual applet UI Specifications.

Action Bar Items Showing State and Availability

Figure 3A:
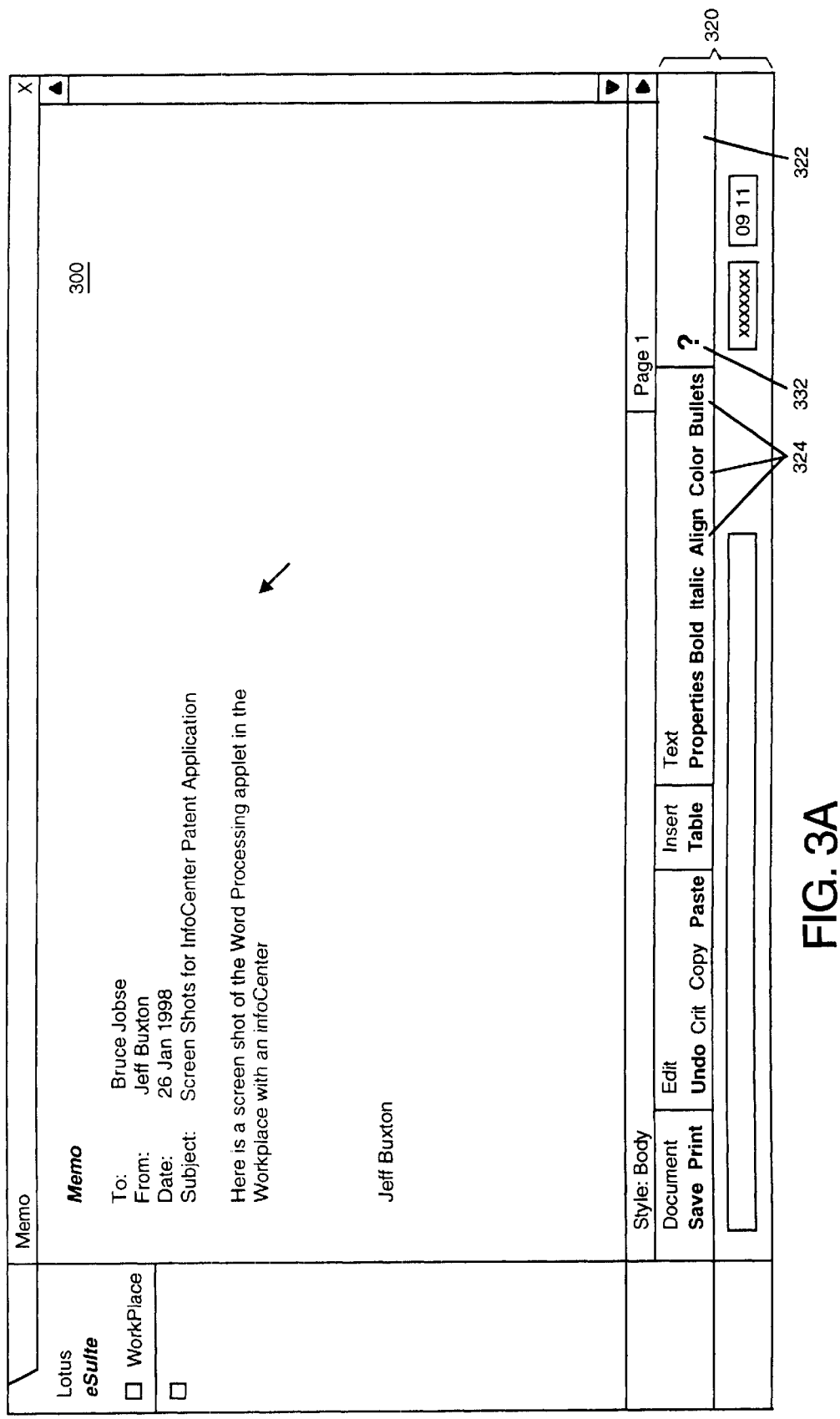
FIGS. 3A–D illustrate the InfoCenter graphical user interface and its component elements in accordance with the present invention.
Figure 3B:
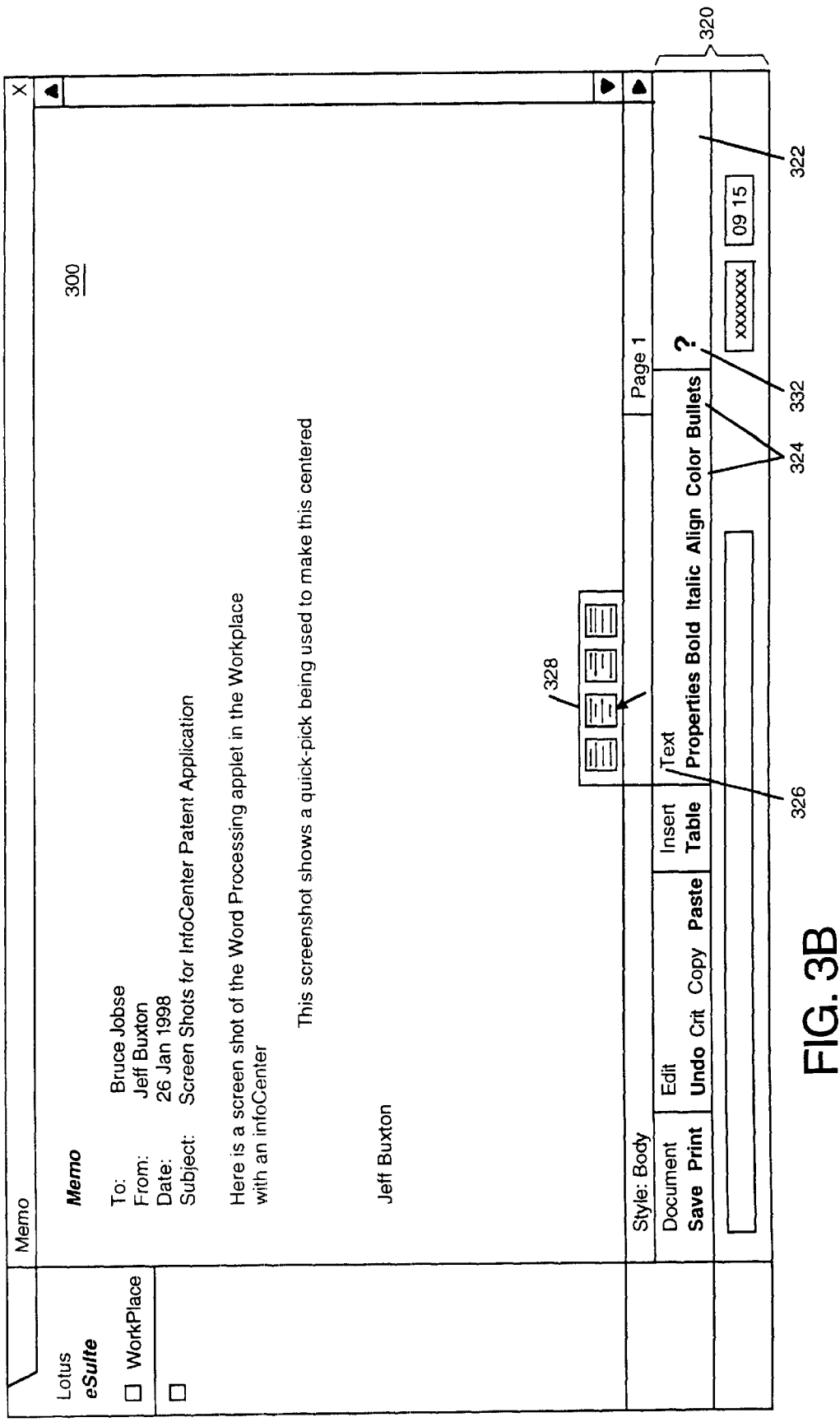
Figure 3C:
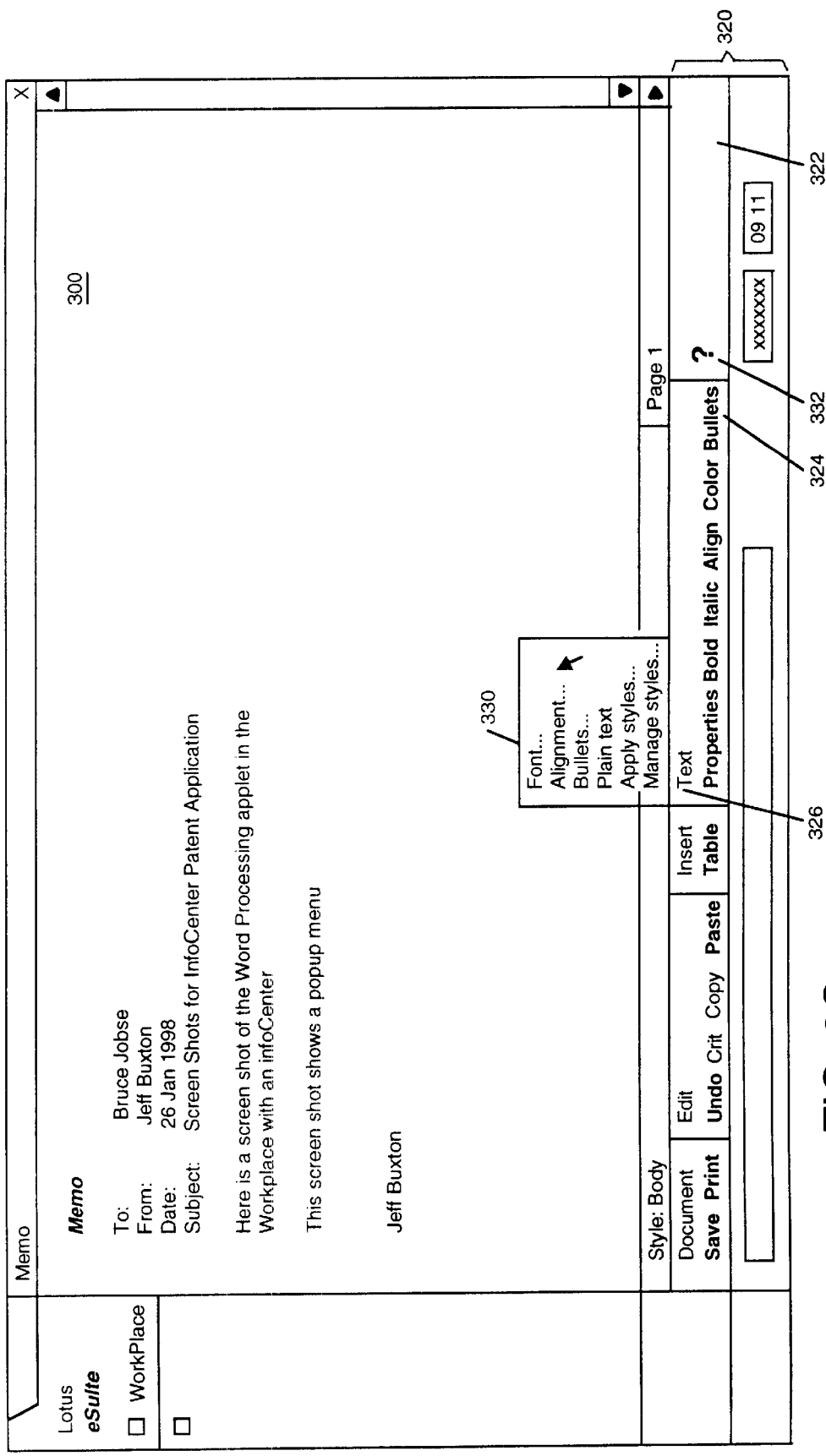
Figure 3D:
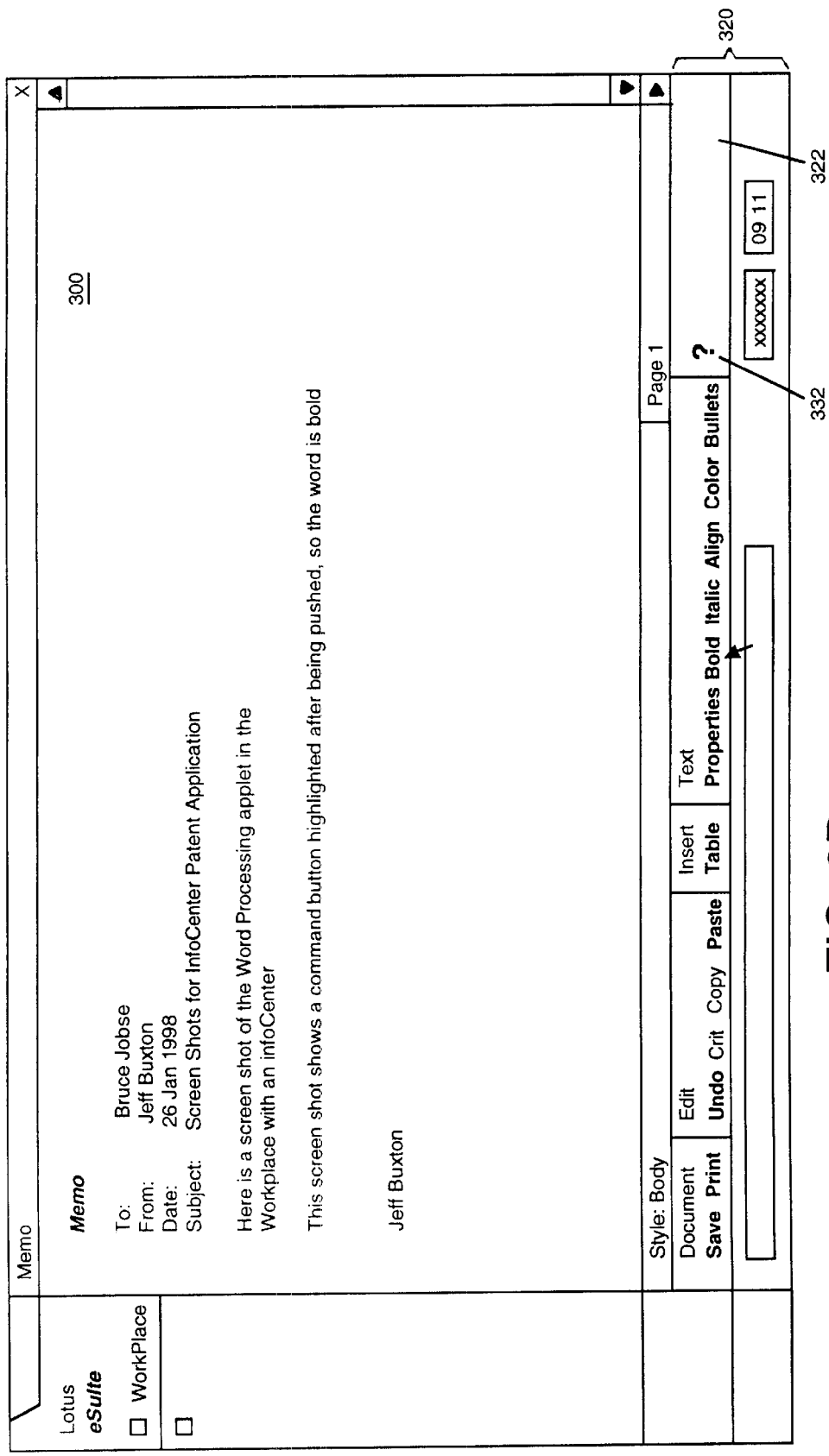
Figure 4A:
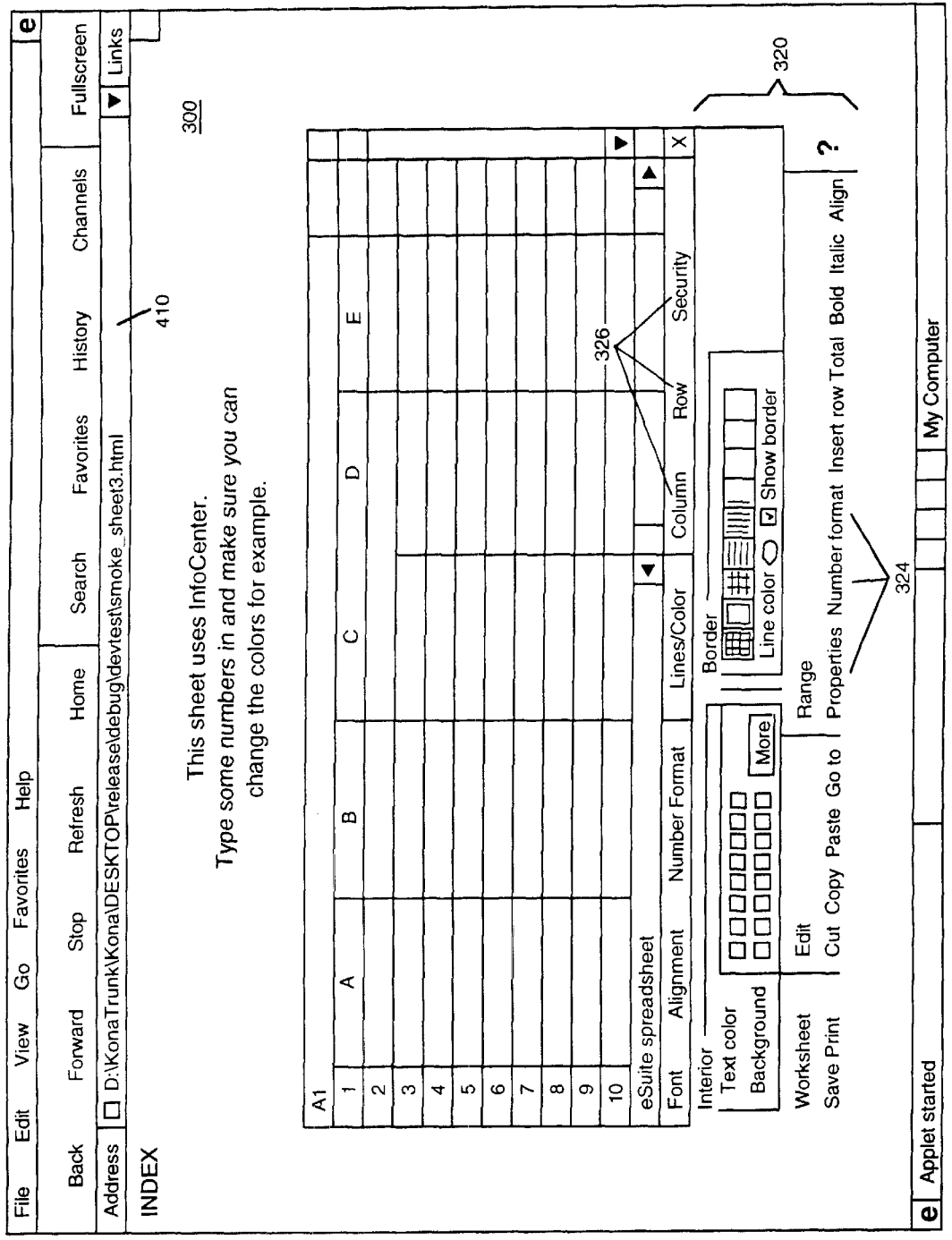
FIGS. 4A–D illustrates the InfoCenter graphical user interface of the present invention as utilized with a browser application.
Figure 4B:
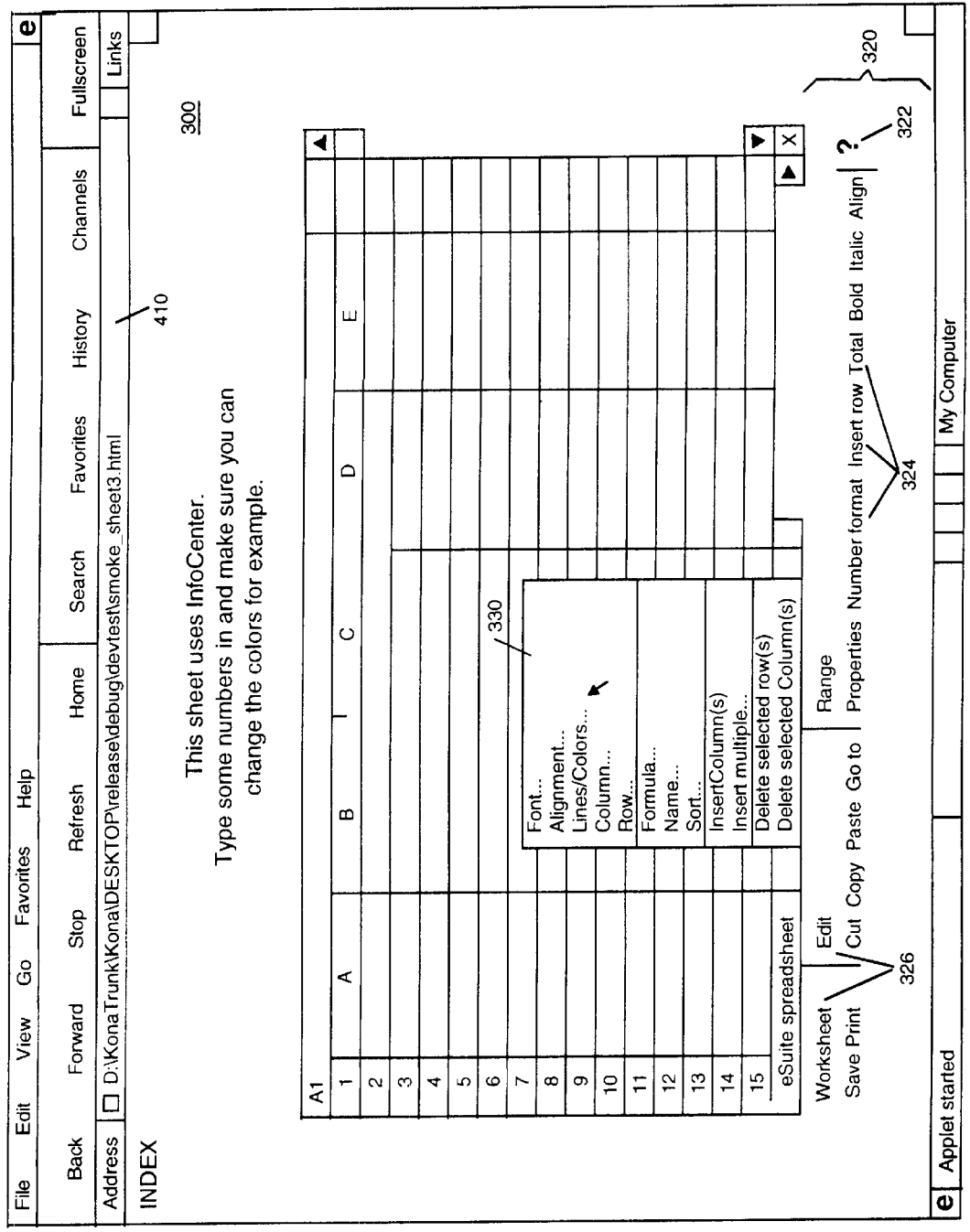
Figure 4C:
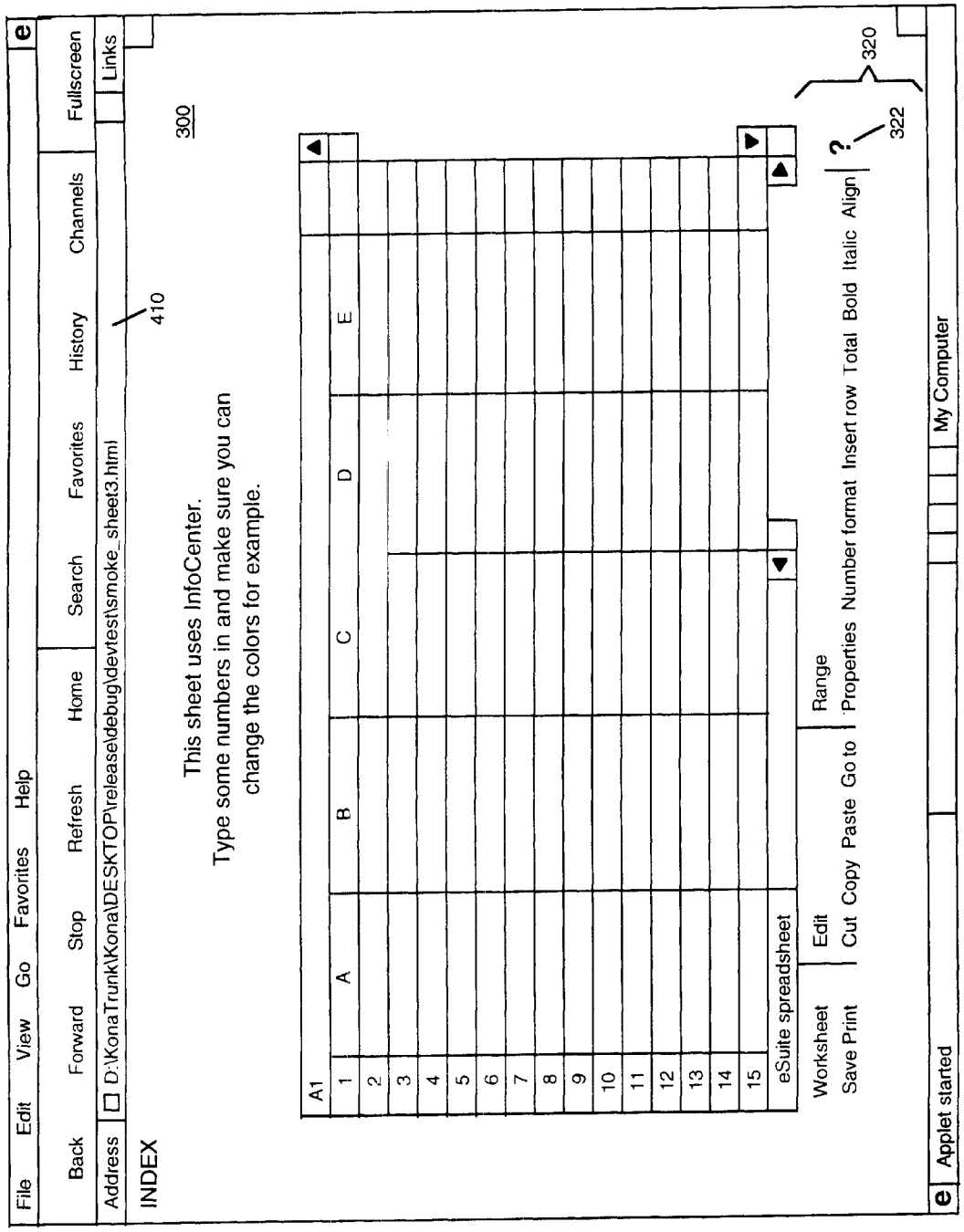
Figure 4D:
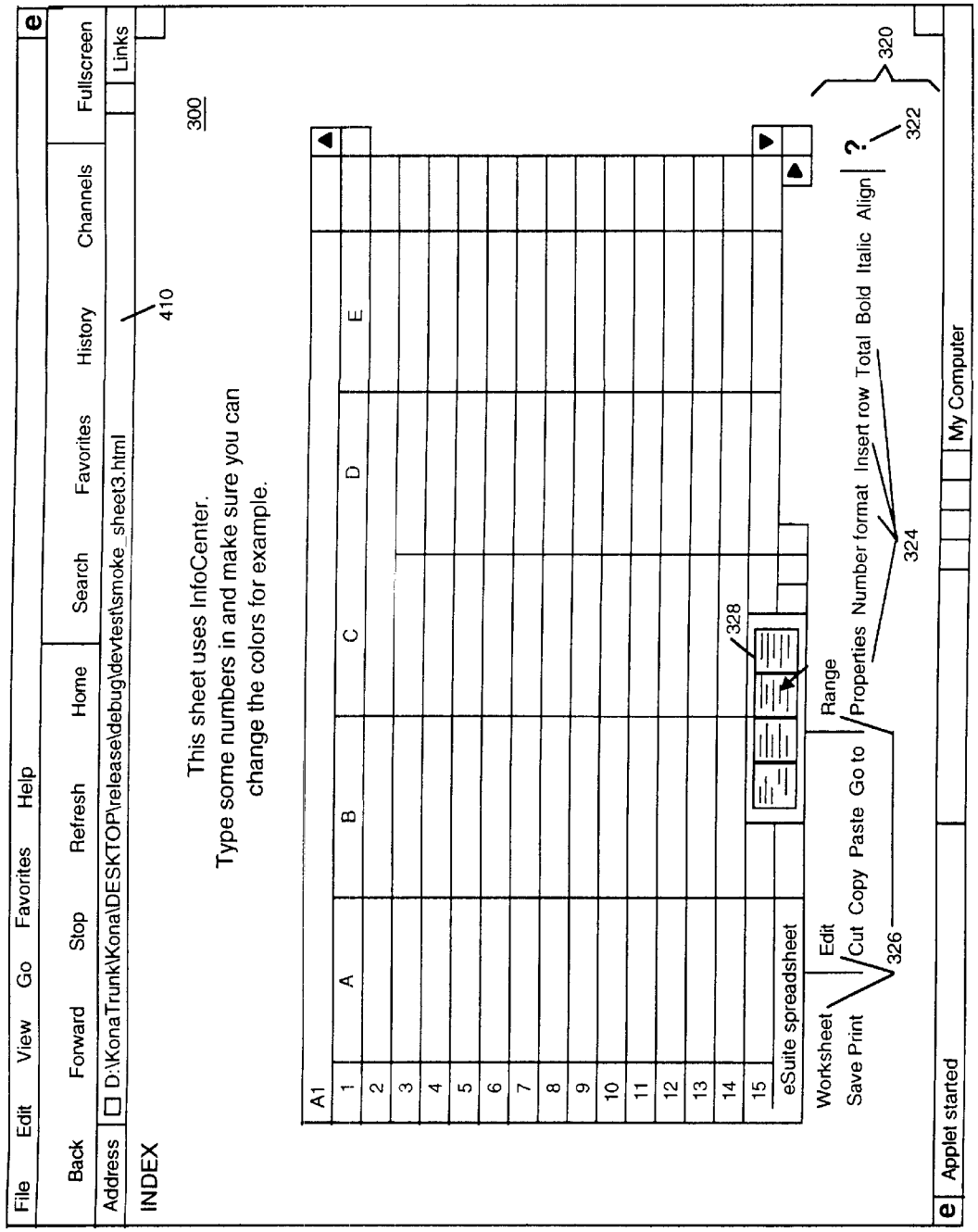

Action Items 324 that toggle on or off may show the current status of the selected object, examples include Bold and Italic, as illustrated in FIG. 3D. Action items 324 that are not available in the current context are dimmed. For example, Paste should be dimmed when nothing is on the clipboard. Menu commands that are identical to action items may mirror the behavior of the corresponding action item. If the Paste Action Item is dimmed because nothing is on the clipboard, the Paste menu item may also be dimmed.

When a user clicks on an item that provides access to a quick-pick control 328, a small options palette pops up, indicating the current selection as illustrated in FIG. 3B. Clicking on an option within the palette immediately applies that option and dismisses the palette. Clicking outside of the palette may dismiss the palette without selecting any option. Focus is returned to the applet, whether or not the user chooses something in the Quick-pick.

If a panel is open when a Quick-pick 328 is selected, the panel remains open, if not, the panel may be dismissed or dimmed. The Quick-pick panel may have the same edge color as the menu widget to help it stand out from the panel underneath. In the illustrative embodiment, the InfoCenter 320 displays panels which allow a user to set properties or complete selected commands. In the InfoCenter, 320 most panels are modeless, allowing users to click outside the panel and perform other tasks. Exceptions may include messages in the current applet which require user acknowledgment.

Automatic Apply

Property panels change to reflect the current selection and automatically apply changes as made. If the selection contains mixed properties, the state based on the settings at the beginning of the selection are shown. For example, in a spreadsheet applet, the properties for the cell in the upper leftmost corner of the selection are shown.

Context-Sensitivity

When a user moves the cursor around an object such as a paragraph or a range of cells, the controls in the InfoCenter Property panels update to reflect the new state. If, however, the user chooses a different object type, such as going from a paragraph to a table, the property panel may automatically dismiss itself.

Such context-sensitivity also applies to selection based command panels too. For example, if a user is working on a table and has brought up the Insert Multiples, rows and columns, e.g. command panel, clicking off the table will dismiss the panel.

Panel Management

Some panels may close after performing actions, such as Print, while others may remain open, such as Find/Replace. Such interaction is specified on a panel by panel basis in the individual applet UI Specifications. If a panel is visible and the user perform an action that displays another panel, the second panel replaces the first panel. When the second panel is closed, no panels are visible.

Default Data

Data for the File Save and File Open panels, as well as certain application-specific panels, as defined in each application specification, are remembered from the last time a panel was visible. If a user changes settings on a panel and then performs that action or switches to another panel, the changed settings are still visible the next time that panel is access. If the user cancels the panel, the values revert to their static default the next time the panel is accessed.

Menu Access

The InfoCenter also provides an organized, categorized means of presenting all the features of an applet. Items are grouped in the action bar by menu structure. A Main Menu Item 326 label appears above the action item group. Clicking on the Main Menu Item 326 label pops up the full list of items for that menu 330, as illustrated in FIG. 3C. Clicking on a menu item performs the specified command. Clicking anywhere outside the InfoCenter dismisses the menu without performing an action. Clicking on another Main Menu Item 326 dismisses the open menu 330 and displays that menu. Clicking on an Action Item dismisses the menu and performs the specified Action Item. Focus is returned to the applet, whether or not the user chooses something in the menu. If a menu item does not apply, such as the Paste command, when nothing is on the clipboard, it will be dimmed, as will the identical Action Item on the action bar. A command can either:

perform an immediate action, such as Cut or Copy;

display a panel to allow you to begin to complete the command, such as Find/Replace, Save, or Print; or display a properties panel, such as Font Properties After choosing a command from the Menu Bar, the menu bar returns to its closed state, and the specified command is performed.

Context Sensitivity

The Menu Bar may be context sensitive, allowing context switching within applets, as well as between applets in future releases. The different contexts, as well as what actions are available within each context, are specified in the individual applet UI Specifications.

Messages and Alerts

A limited number of different types of messages and notifications are included in the InfoCenter. The messages and notifications fall into the following broad categories:

Modeless floating window messages

Modal floating window messages

Notification/Status messages

The last type listed, Notification/Status messages such as "You have new mail" and "Calculating . . .", appears in the message area of the NC Desktop. In addition to message notifications, there are four states for icons in the eSuite Desktop open task list: Normal, Busy, Error, and Notification.

Help

Help is accessed from the action bar using a "?" icon 332 as the right-most item as shown in FIG. 3. When the user chooses the "?" Action Item, a pop-up menu appears. From there, he or she can go directly to a context-sensitive Web page at Lotus though it cannot be sensitive to selections on the action bar or a Contents page for that applet's help. Access to the About Box including proprietary notices is available from the "?" menu.

General InfoCenter Interaction

Resizing

If the work area is expanded, white space is added to the right side of the action bar and to the right of all panel/dialog controls that are not anchored to the right-hand side of the panel. When working in a screen resolution of 800×600, the work area may be 640×547. When the work area is expanded, the work area will increase its width by 112 for a total of 752 pixels. Panels may be 640 pixels wide and anchor particular controls to the right-hand side of the panel. Tabs may be anchored on the left, as well. When the panels resize, the controls that are anchored will remain tied to the right side of the panel.

Scrolling

Applet space scroll bars and workspace may end above the InfoCenter thereby reducing the amount of applet workspace when a panel has been opened. When an InfoCenter panel pops up, the applet shrinks its vertical space to make room for the panel. When no panels are open the scroll bar ends above the action bar.

InfoBus Architecture

The InfoCenter communicates with applets executing in the same environment via an information bus architecture referred to hereafter as the InfoBus. The architecture of the InfoBus is described in the publicly accessible specification entitled InfoBus Specification 1.1.1 available from Lotus Development Corp. and is the subject of the copending U.S. patent applications referenced in the Related Applications Section of this application. It is described in part hereafter for the reader's benefit with reference to FIG. 5. The InfoBus architecture enables developers to create a new class of dynamic applications in which data exchange is based on information content. For example, a single database access component can offer the InfoBus information from a wide variety of databases. The information on the InfoBus is dynamically tagged by its content. Data consumers such as a charting or reporting component can receive the data based on the dynamic tags. In addition, in the contemplated embodiment, the InfoBus architecture provides mechanisms for transmitting highly-structured data such as keyed rows in a collection. As a member of the InfoBus, any exchange information with any other component in a structured way. Simple items like strings and numbers and complex items like lists, arrays and tables can be tagged over the virtual information bus. For example, a component could provide a user interface that allows users to select an item, such as an account number, and publish the selected item on the InfoBus. In response, a second component lists names for the account number, could look up information from an external database and publish it in a table of results over the InfoBus. Finally, a third component, such as a spreadsheet, could access this result table and display it or use it for further analysis. Developers build InfoBus applications by presenting a set of cooperating components in a design environment, such as a HTML document or a webpage. The components communicate via the InfoBus making it possible to divide the application into manageable pieces.

The InfoBus interfaces allows application designers to create "dataflows" between cooperating components. In contrast to an event/response model where the semantics of an interaction depend to an understanding an applet-specific event and responding to that event with applet-specific call backs, the InfoBus interfaces have very few events in an invariant set of method calls for all applets. The semantics of data flow are based on interpreting the contents of data that flows across the InfoBus interfaces as opposed to responding to the names of parameters from events or names or parameters of callbacks.

The components which comprise the InfoBus architecture can be classified as data producers, data consumers and data controllers. Data producers respond to requests for data from consumers. Data consumers comprise components interested in hearing about any new data sets that enter the database environment. Data controllers optionally regulate and redirect the flow of data between data producers and many consumers.

Any Java component can connect to the InfoBus architecture. The unique InfoBus context identifiers established for a component in the InfoBus for the components contexts is returned. Once a component establishes participation in an InfoBus, all InfoBus notifications arrive via standard Java event mechanisms. In the contemplated embodiment, rendezvous of data to be exchanged are asynchronous. Data producers announce the availability of new data as it becomes available. For example, completion of a URL read, or completion of calculation. Data consumers solicit data from producers as are needed, for example, at applet initialization, redraw, etc. Different data producers manage different types of data while data consumers may receive such data in simple or complex way. To accommodate the needs of both data producers and data consumers, the InfoBus architecture defines a number of data access interface. These interfaces given the data consumer choices about how to navigate through the data provided by a data producer. Producers choose the most appropriate access types and publish the data as an item of that type, while data consumers may use the data as the type specified or as a supertype. For example, a spreadsheet component might publish a name arranged as an ArrayAccess data item. One consumer might process this data using ArrayAccess because this is the best match for its needs while another data consumer would choose the super type collection access, as explained hereinafter.

As such, the InfoBus architecture of the present invention adds additional features required for more dynamic data exchange. For example, where communication is driven by the content of the data and where the nature of the data to be exchanged is determined at run time. The InfoBus architecture is complimentary to and extends the Java Beans environment by providing a set of enhanced interfaces that Java Bean components can use to share and exchange dynamic data.

The InfoBus architecture itself is defined by a class definition which includes the data items and methods described hereinafter. One or more instances of an InfoBus may reside on a computer system, which, in the illustrative embodiment, comprises a Java virtual machine environment. A class implements the InfoBusMember object to join the InfoBus, in preparation for receiving events about data on the bus.

Applets can implement InfoBusMember using methods provided in the InfoBusMemberImpl class to completely support InfoBus membership, the methods in this helper class use the class InfoBus methods for their implementation. For example, InfoBusMemberImpl.joinInfoBus calls one of the static open( ) methods on the InfoBus class to find or create the required InfoBus instance, then calls join( ) on the instance to become a member.

Applets may use the default InfoBus when running outside of a builder environment. One of the open( ) methods takes a Component argument which is used to calculate the default bus name from the "docbase" of the applet. Therefore, the component must either be an applet itself, or have an applet in its AWT containment hierarchy so that we can traverse upwards to the applet. The caller itself need not be such a component, but it must be able to supply one.

An applet builder environment needs to be able to open an InfoBus instance without necessarily joining it and telling the applets it contains to talk on that bus. Rather than using the default InfoBus for a component context, it will be handier to supply a name to be used for creating the InfoBus instance; a variant of the open( ) method allows the caller to pass a String that specifies the name of the required bus. In this case the builder environment has no particular requirements, i.e., it need not be an applet, because the "docbase" is not required.

Both open( ) methods return a reference to the InfoBus instance that satisfies the request. This instance is used for all future communication to the InfoBus. For example, to become a member of this bus, the member simply calls the join( ) method on the returned instance, and leaves by calling leave( ).

Membership is typically established during class initialization before the start( ) method is called.

InfoBus Event Listeners

InfoBus components must listen for events to discover the availability or revocation of DataItems, or to hear requests for named DataItems, or both. The way an InfoBus component uses events identifies it as either a Data Producer or a Data Consumer. A component can be both a Data Producer and a Data Consumer, for example it could filter data from a Data Producer and supply it in a new form for a Data Consumer.

The distinction between a consumer and a producer class is reflected in the type of interface(s) class implements, e.g., one or both of InfoBusDataConsumer and InfoBusDataProducer, and how the class registers itself with the InfoBus, i.e., by calling the addDataConsumer or addDataProducer methods, or both.

Data Consumers

A data consumer is an InfoBus component that listens for the availability or revocation of DataItems, and/or requests DataItems by name. The interface InfoBusDataConsumer defines the methods for handling InfoBusItemAvailableEvent and InfoBusItemRevokedEvent notifications. The Data Consumer determines whether it is interested in the event by inspecting the DataItem name in the InfoBusEvent object. An accessor method, InfoBusEvent.getDataItemName, provides a String identifier for the data.

DataItems can be requested by name by calling a find method in the InfoBus class. Data Consumers are permitted to issue data requests without having received a InfoBusItemAvailableEvent. The requesting Data Consumer will simply get a null result if the requested data is unavailable from any Data Producer. Such a blind request is often required when a Data Consumer initializes, in case an available event on the InfoBus was sent before the Data Consumer had completed initialization.

A data consumer may also implement the DataItemChangedListener interface. After rendezvousing successfully and receiving an initial DataItem, the consumer registers for change notifications via the addDataItemChangedListener( ) method on the DataItem. When the producer of the data makes subsequent changes to the DataItem, the DataItem send a DataItemChangedEvent to all registered listeners. As a DataItem may itself contain a hierarchy of other DataItems, the DataItemChangedEvent is received for the "top-level" DataItem associated with the initial rendezvous name.

Data Producers

Any InfoBus component may function as a Data Producer providing the appropriate interfaces described herein are implemented. Essentially, data Producer is an InfoBus component that responds to requests for data from Data Consumers. Data is requested from a Data Producer by calling the findDataItem method on the InfoBus class. The find DataItem method takes the name of the desired data and solicits data from all bus listeners by calling the requestDataItem( ) method on each InfoBusDataProducer registered with the InfoBus. If the Data Producer cal fulfill the request, it responds by returning a reference to a class implementing the DataItem interface.

Another role of a data producer is to announce data availability or deletion by sending InfoBusItemAvailableEvents or InfoBusItemRevokedEvents methods to the InfoBus. The InfoBus then distributes these events to all InfoBusDataConsumers by calling the dataItemAvailable and dataItemRevoked methods.

Data Items

In the illustrative embodiment, DataItems are Java objects that implement the javax.infobus.DataItem interface. The InfoBus standard provides a set of "data access" interfaces which extend DataItem in order to provide for retrieval or navigation of the DataItem's content.

Creation of the DataItem objects with access interfaces does not require that the data be retrieved provide access interfaces. By keeping the creation of a DataItem object cheap, a consumer can expect to request the item only to discover its MIME type from the Transferable object in order to decide whether to use it or discard it, and expect that this will all be fairly fast.

Only objects that implement the DataItem interface may be passed on the InfoBus. In the illustrative embodiment, for direct retrieval of data content as a simple String or Object, the ImmediateAccess subinterface of DataItem is provided.

A DataItem can be retrieved as a String or a Java object. Java objects are typically object wrappers for primitive types such as Double or instances of other core classes such as InputStream. Little specialized understanding of data format on the part of the data consumer is required. For complex reinterpretations of underlying data, the DataItem provides an optional method that returns a Transferable object, which exposes the DataItem.

With the InfoBus Architecture a collection of DataItems can be passed as a single DataItem, using one of the following interfaces for navigation of a collection: CollectionAccess, ArrayAccess, KeyedAccess, DbAccess, and RowsetAccess. DataItems may optionally implement both a collection interface and an ImmediateAccess interface. From such a data item, simple data can be obtained by asking for one of the immediate renderings, and more detailed information can be obtained by navigating the data item using the implemented collection interface.

InputStreams are considered single-valued items and could be presented in an ImmediateAccess object. The intent of the InfoBus, however, is to impose structure on the data, in an effort to make the data comprehensible to the widest audience of data consumers. Some types of InputStreams, however, like multimedia streams that are "played" by the recipient, will not lend themselves to such formatting.

Data Controllers

In the illustrative embodiment, the InfoBus architecture may optionally implement Data Controllers. The role of a Data Controller is to play traffic cop on the InfoBus. Essentially, a Data Controller is an optional component that exists between any Data Producer and its Data Consumers. The Data Controller regulates or redirects the flow of data. In the presence of a Data Controller, individual Data Producers and consumers do not talk to each other directly, but instead communicate through the third-party controller. This requires no programmatic changes to either Data Producers or Data Consumers. If one or more Data Controllers are registered on the InfoBus, events arriving on the bus are distributed only to the Data Controllers. The Data Controllers then assume responsibility for identifying the potential Data Consumers of each event and distributing the DataItems to them directly.

Data controllers are potentially quite complex, and may keep track of Data Producers which have offered particular DataItems, and, of Data Consumers that have requested DataItems, in order to provide late binding of producer to consumer.

Data Exchange Process

The InfoBus protocol for data exchange consists of the steps of 1) Membership, i.e., establishing InfoBus participation; 2) Listening for InfoBus events; 3) Rendezvous on the data to be exchanged; 4) Navigation of structured data; and 5) Retrieval of an encoding of the data value. This process will be described in greater detail hereinafter.

In the illustrative embodiment, any Java component, including the InfoCenter, can connect to the InfoBus by implementing an InfoBusMember object, obtaining an InfoBus instance, and having the InfoBus member join the instance of the InfoBus. The InfoBus provides a class that supplies an implementation for each method defined for InfoBusMember.

Once an object is a member of an InfoBus, it can receive bus notifications via the standard Java event mechanisms, understood by those in the arts. Two listener classes are defined to support two basic types of InfoBus applications. A Data Consumer can receive announcements about data availability by adding an InfoBusDataConsumer listener to the InfoBus via the addDataConsumer method. Similarly, a Data Producer can receive requests for data by adding an InfoBusDataProducer listener via addDataProducer method. An applet can serve as both a consumer and producer of data, for example in a filtering application, by implementing both types of event listeners.

Listeners are normally added during the processing of the start( ) method, or its equivalent, and removed during the processing of the stop( ) method. With this technique, InfoBus member to stop receiving events when the page it is on is inactive.

In the illustrative embodiment, Data Producers "announce" the availability of new data as the data becomes ready, e.g., completion of a URL read, completion of a calculation, etc. Consumers solicit data from producers as they require that data, i.e. applet initialization, button event, etc. With InfoBus architecture, the rendezvous is by the name of the data. The application designer designates the names for data items that can be exchanged over the InfoBus.

Data Producers and Data Consumers implement some mechanism for the application designer to specify Data Item names for rendezvous. For example, in a spreadsheet component, the user can "name" ranges on the sheet. Such name is a natural mechanism for naming data that can be exported by the sheet in a role as a data producer. Similarly, a chart component needs a parameter telling it what named data should be displayed in the chart.

Different Data Producers often use different internal representations of data that is superficially similar. For example, a spreadsheet and a database both deal with tables, but store them quite differently. In a spreadsheet, the table of data might be represented as the output of a calculation, such as a matrix transpose, or as an array of formulas, while in a database the, same information might be represented as the result of a join query.

A Data Consumer, however, should not need a detailed understanding of the data producer's internal data structures. A charting component should be able to draw a chart of a table from either a spreadsheet or a database, whenever the table makes sense as a chart. In practice, this sort of information sharing requires a consumer and producer to agree on a common encoding of the data.

InfoCenter/Component Communications

Utilizing the InfoBus architecture described previously, the InfoCenter of the present invention communicates with the applets in the same environment. As an InfoBus member, the InfoCenter may act as either a data producer or a data consumer. The method by which an applet and the InfoCenter interact over the InfoBus comprises the following steps: 1) the applet announces a SelectionContext containing a Selection via the InfoBus; 2) the InfoCenter hears about the SelectionContext, retrieves a Selection and queries the Sselection object for a user interface description; 3) the InfoCenter displays an ActionBar based on the UI description; 4) when a user clicks on a button or menu item, the InfoCenter may display additional UI e.g. panels or popup widgets; 5) and when the user clicks on something which alters an applet property or sends a command to an applet, the InfoCenter calls a setProperty or doCommand method on a class specified in the user interface description.

Figure 5:
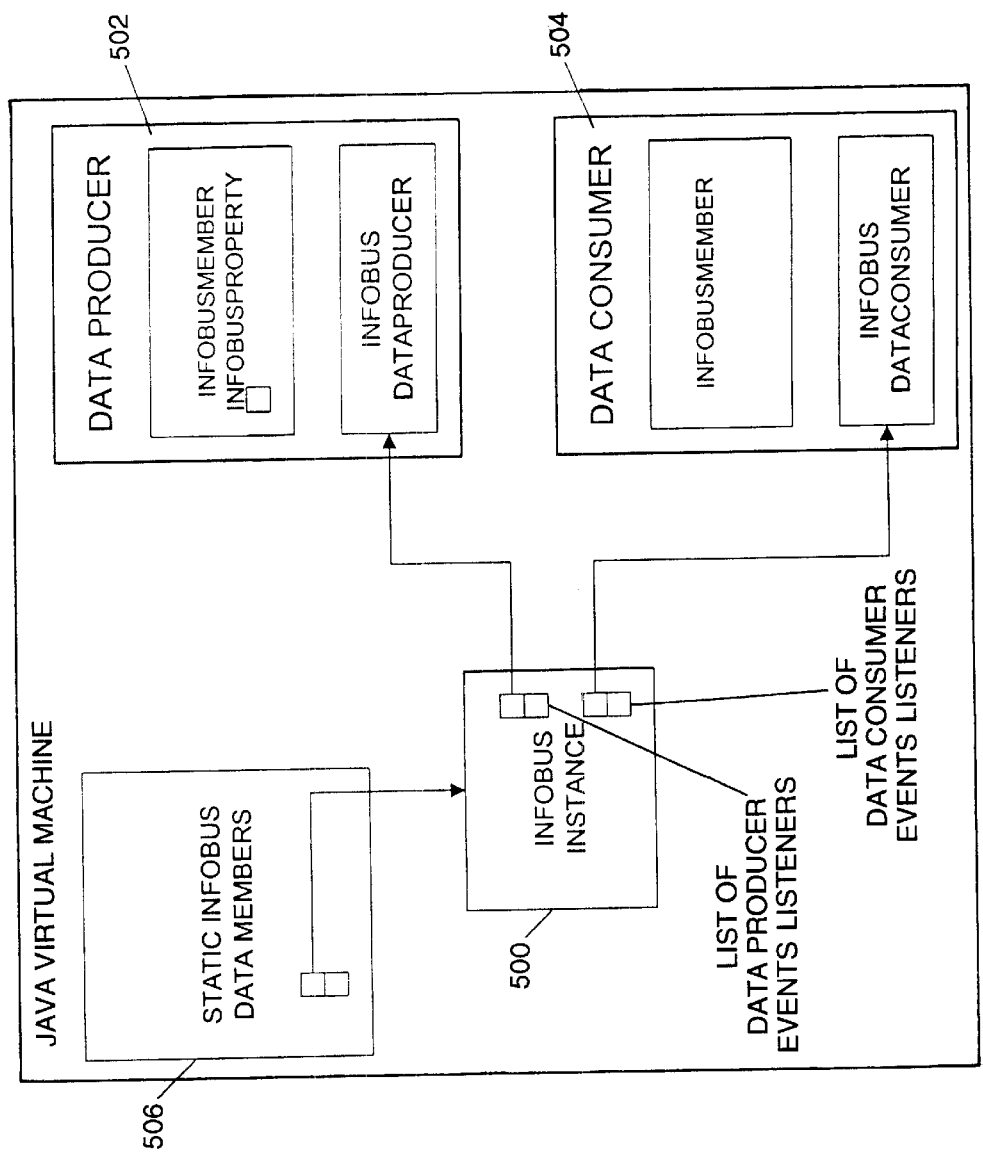
FIG. 5 is a conceptual block diagram of the communication path between the InfoCenter and an applet via the InfoBus in accordance with the present invention.

This process is illustrated with reference to the flowchart of FIG. 6. and the block diagram of FIG. 5. FIG. 5 illustrates conceptually an InfoBus 500 with two InfoBus members 502 and 504. The InfoBus exists in a Java virtual machine (JVM) environment. For purposes of illustration, data producer 502 is assumed to be an applet while data consumer 504 is assumed to be the InfoCenter module. Once InfoBus members 502 and 504 enroll with the InfoBus instance 500, they are free to exchange data items as previously described. The interaction between a InfoCenter module 504 and an applet 502 occurs with reference to the process of FIG. 6. The process by which the InfoCenter interacts with an applet begins with Step 600 where the InfoCenter 504 becomes a member in an InfoBus instance, in a manner as described previously. Next, the InfoCenter listens for specific named events, particularly the announcement of an object selection by the applet, i.e. data producer 502, as illustrated by decisional step 602. If such an announcement is received, the InfoCenter module 504 queries the selected object about the user interface requirements, as illustrated by Step 604. Next, the applet 502 transmits to the InfoCenter module 504 a description of the user interface associated with the selected object or a reference thereto, as illustrated by Step 606. In response, InfoCenter module displays the appropriate user interface action bar and associated elements, as illustrated in Step 608. When a user clicks on a Widget or menu item in the InfoCenter, the InfoCenter displays additional panels, menu items or pop-up widgets, as applicable. If the user selects a property which alters the applet or sends a command to the applet, as illustrated by decisional Step 610, InfoCenter module will call the appropriate method for the class specified in the user interface description upon receipt of such selection or command by the user, as illustrated by Step 612, FIG. 6. For a selection which alters the property of an applet, the InfoCenter will typically call the set property method while the transmission of a command to the applet results in the InfoCenter calling the doCommand method.

Figure 6:
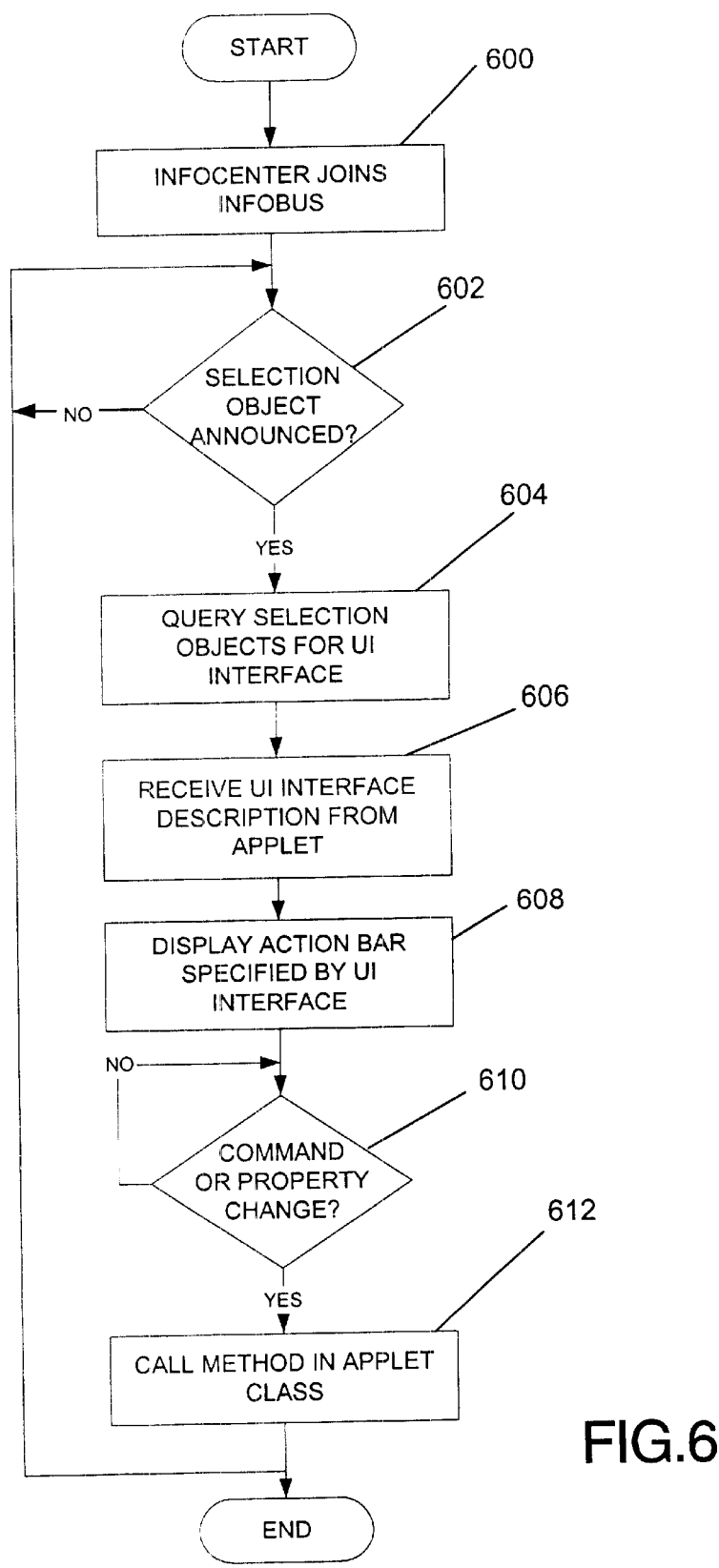
FIG. 6 is a flow chart illustrating the process steps by which an applet interacts with the InfoCenter user interface of the present invention.

Utilizing the process illustrated in FIG. 6, the changes to the user interface required by an applet are essentially decoupled from the InfoCenter module itself, enabling the InfoCenter to be dynamically reconfigured according to the requirements of a specific applet. The design requirements for an applet in order to utilize the functionality of the InfoCenter are set forth below.

Applet Design Requirements

Figure 7:
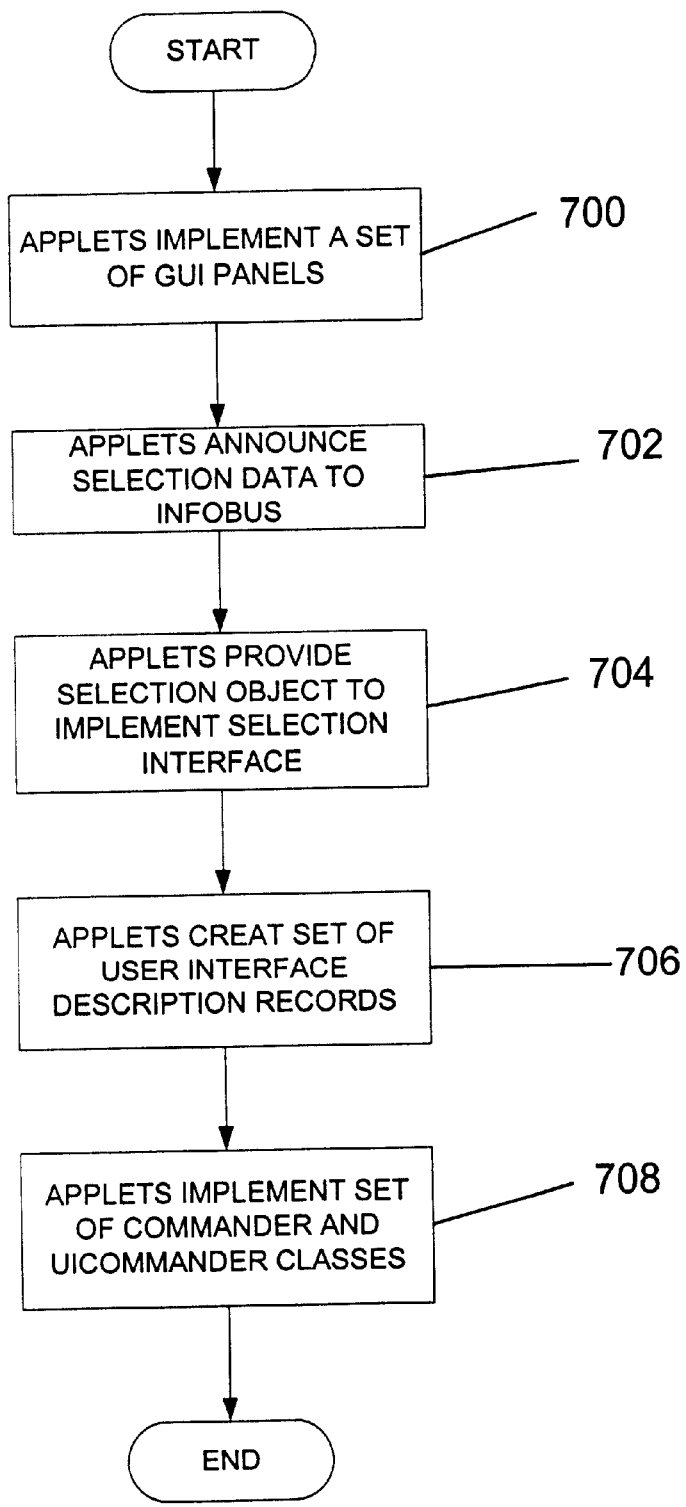
FIG. 7 is a flow chart illustrating the process steps by which the invention generates a User Interface within an InfoBus system.

FIG. 7 is a flow chart conceptually illustrating how a graphical user interface is provided via the InfoCenter in accordance with the illustrative embodiment. Initially, applets first implement a set of GUI panels, as illustrated in Step 700. Next, the applets announce selection data to the InfoBus at startup, on selection change and when focus is set as illustrated in Step 702. The applets then provide a selection object that implements the selection interface, as illustrated in Step 704. The applets create a set of user interface description records, as illustrated in Step 706. Finally, the applets implement a set of commander and UICommander classes, which is shown in Step 708.

The above process is described hereafter in greater detail. In step 700, applet designers create UI panels using a visual interface builder such as Bongo, commercially available from Marimba, Inc., Mountain View, Calif., and a set of widgets provided by the applet. Standard Bongo widgets may be used for panel widgets that are not interactive (e.g. label widgets). However, if the applet needs to get or set a widget value, a Lotus-specific widget may be used.

Widgets are accessed in code via their Name property. The name field is set in the widget property panel when creating the panel in Bongo. This name, called the Property Id, can be set by the designer or added later by an applet developer. Property ids can be any string, as long as the commander code for the panel can interpret that value. Usually, property ids are defined as a static member variables in the associated commander class. The Commander interface method, getIDFromString, is called by the InfoCenter code to translate the name to an integer id.

In step 702, applets provide selection information to the InfoCenter via the InfoBus. When an applet starts up, it "connects" to the InfoCenter by announcing its current selection. This Selection is wrapped in a SelectionContext object and presented to the InfoCenter via an InfoBus ImmediateAccess object. The SelectionContext class is described below. Each time the selection changes, the applet updates the information on the InfoBus. This is the only connection mechanism between applet and InfoCenter. There is a helper function defined in LFCApplet for applets to use for announcing Selection information on the InfoBus.

The public void assertSelection(Selection selection) method may be called by the applet on startup, each time the selection changes, and when the applet gets FOCUS.

In the case of more than one Applet in an AppletContainer, each applet will announce its selection as described above. Each new announcement will change the InfoCenter context. When an applet is going away, LFCApplet will send the DATAREVOKED message for the Selection DataItem.

The SelectionContext class allows the InfoCenter to get the various parameters for a selection assertion. These are stored in an instance of this class before it is placed in a SelectionDataItem. The SelectionContext class is defined as follows:

public class SelectionContext implements Cloneable
  {
    public SelectionContext( )
    public void release( )
    public void setSelection(Selection selection)
    public Selection getSelection( )
    public static final int SC_NEW_SELECTION=0;

```
public static final int SC_SAVE_STATE=1;
public static final int SC_HIDE_UI=2;
public void setType(int type)
public int getType( )
public void setUserInterfaceState(UserInterfaceState
    uiState)
public void setUserInterfaceState(ActionDescriptor ad)
public UserInterfaceState getUserInterfaceState( )
public void setActionDescriptor(ActionDescriptor ad)
public ActionDescriptor getActionDescriptor( )
public void setICClientPreLoader(ICClientPreLoader
    clientPreLoader)
public ICClientPreLoader getICClientPreLoader( )
public int hashCode( )
public boolean equals(Object obj)
public Object clone( )
}
```

The SelectionContext( ) constructor is used to create a SelectionContext.

The release( ) method is used to release any references held by this Selection Context.

The setSelection( ) and getSelection( ) methods are used to manage the Selection interface held by this SelectionContext.

The setType( ) and getType( ) methods use ints with the following values to control how the InfoCenter interprets the selection made:

The SC_NEW_SELECTION is the default type of Selection held in this SelectionContext, and indicates a new selection (either with UI State or without). If made with a UI state, the InfoCenter restores the UI State as a new selection. If made without UI state, the InfoCenter queries the Selection (obtained via getSelection on this object) for a new user interface representation.

The SC_SAVE_STATE indicates that a selection was made to save the UI State. The InfoCenter will then save the current UI state into this SelectionContext object by calling setUserInterfaceState, described below.

The SC_HIDE_UI indicates that a selection was made to hide the current user interface (UI)

The setUserInterfaceState method comes in two flavors: one method takes a UserInterfaceState object, and the other an ActionDescriptor. Both methods will store a UserInterfaceState object in this SelectionContext. A UserInterfaceState object has the following definition:

```
public class UserInterfaceState implements Serializable
{
    public UserInterfaceState(ActionDescriptor
        actionDescriptor, int pageNumber)
    public UserInterfaceState(Action Descriptor action
        Descriptor)
    public String getActionDescriptorID( )
    public void setAction Descriptor(Action Descriptor
        action Descriptor)
    public ActionDescriptor getActionDescriptor( )
    public void setPageNumber(int pageNumber)
    public int getPageNumber( );
}
```

There are two constructors for a UserInterfaceState: both take an ActionDescriptor, and the first form can also take a page number. The constructor without a page number sets the page number to −1 to indicate the default page in a panel.

The getActionDescriptor method gets the stored ActionDescriptor in this UserInterfaceState, which is set by calling the setActionDescriptor( ) method. The ID String of the current ActionDescriptor can be retrieved by calling the getActionDescriptorID( ) method.

The getPageNumber( ) method is used to return a page number in a panel to turn to, while setPageNumber is used to set that page number in a panel to turn to.

The UserInterfaceState uses the Java Serializable interface to implement its persistence. Only the action ID string and the page number are persisted, however.

In step 704, in order to provide an InfoCenter UI, the selection object implements the Selection interface. The Selection interface methods provide the information that describes the applet. The selection interface may be implemented with the following methods:

```
public interface Selection
{
    public ActionBarAD getActionBarAD( );
    public Object getOwner( );
    public Component getComponent( );
    public Commander getCommander(String
        commanderId);
    public UICommander getUICommander(String
        commanderID);
    public PropertyPanelAD getDefaultPropertyPanelAD(
        );
    public Locale getUILocale( );
    public Locale getActiveLocale( );
}
```

The getActionBarAD method returns the Action Descriptor which describes the action bar for the current selection.

The ActionDescriptors define the contents, display and behavior of the action bar and its buttons and menus. These descriptors are described in greater detail hereafter. The return value from getActionBarAD is the Action Descriptor for-the default ActionBar for this selection.

The getowner( ) method returns the owner of the selection. This method can be used to delegate commands to the object who implements a particular interface. For example, in an applet, if a table were the selection and the print command was issued, the print com0mander would check whether the selection, i.e., the table, implements printable. Since tables don't implement printable, the commander would call selection.getOwner( ), which returns the AppletObject. The getOwner method checks whether the selectionOwner implements printable. If so, the commander would then call the appropriate print interfaces on the AppletObject. Depending on an applet's granularity of selection, the commander may continue calling getOwner( ) several times until it either finds an object who implements the specified interface or until getOwner( ) returns null or an object that doesn't implement Selection. Alternatively, the getowner( ) may be implemented using the Beans.isinstanceof, Beans.getinstanceof methods. However, there are some convenience methods provided in the DefaultCommander base class which provide alternative ways to find a commander which implements a specified command. See the description of the walkSelectionHierarchy, walkVisualHierarchy and doCommandTo methods in the description of DefaultCommander in FIG. 5, hereafter.

The getComponent( ) method is used by a Selection to indicate the Component that should receive user interface keyboard focus (hereinafter referred to as focus) when the InfoCenter wishes to relinquish focus.

The getCommander( ) method is used when the InfoCenter wishes to execute a command requiring no user interface, and the getUICommander( ) is used when the InfoCenter wishes to execute a command that requires a user interface. The InfoCenter uses ActionDescriptors to determine which to call.

The getDefaultPropertyPanelAD( ) method returns the action descriptor for the default property panel for this selection. It is used when the InfoCenter currently is displaying a property panel is up and the user selects a new selection. A property panel for the new selection. should be shown at this time. If a property panel is showing and a new selection is received, the InfoCenter will ask the new Selection for its default property panel action descriptor. It will then show the default property panel.

The getUILocale( ) method is called to obtain the Locale for the current user interface. The implementer of selection can use this to control the Locale from which resources are obtained when displaying user interface. Locale information is used to present user interface for varying countries and languages.

The getActiveLocale( ) method is called to obtain the active Locale from the current Selection The active locale is used for all Locale information not connected to the display of the user interface, such as for sorting text or the display of currency, and so on. For example, if the UI Locale is French and the active Locale is German, then the user interface will appear in French, but currency will appear as German, and text will be sorted using the rules appropriate for German.

Figure 8:
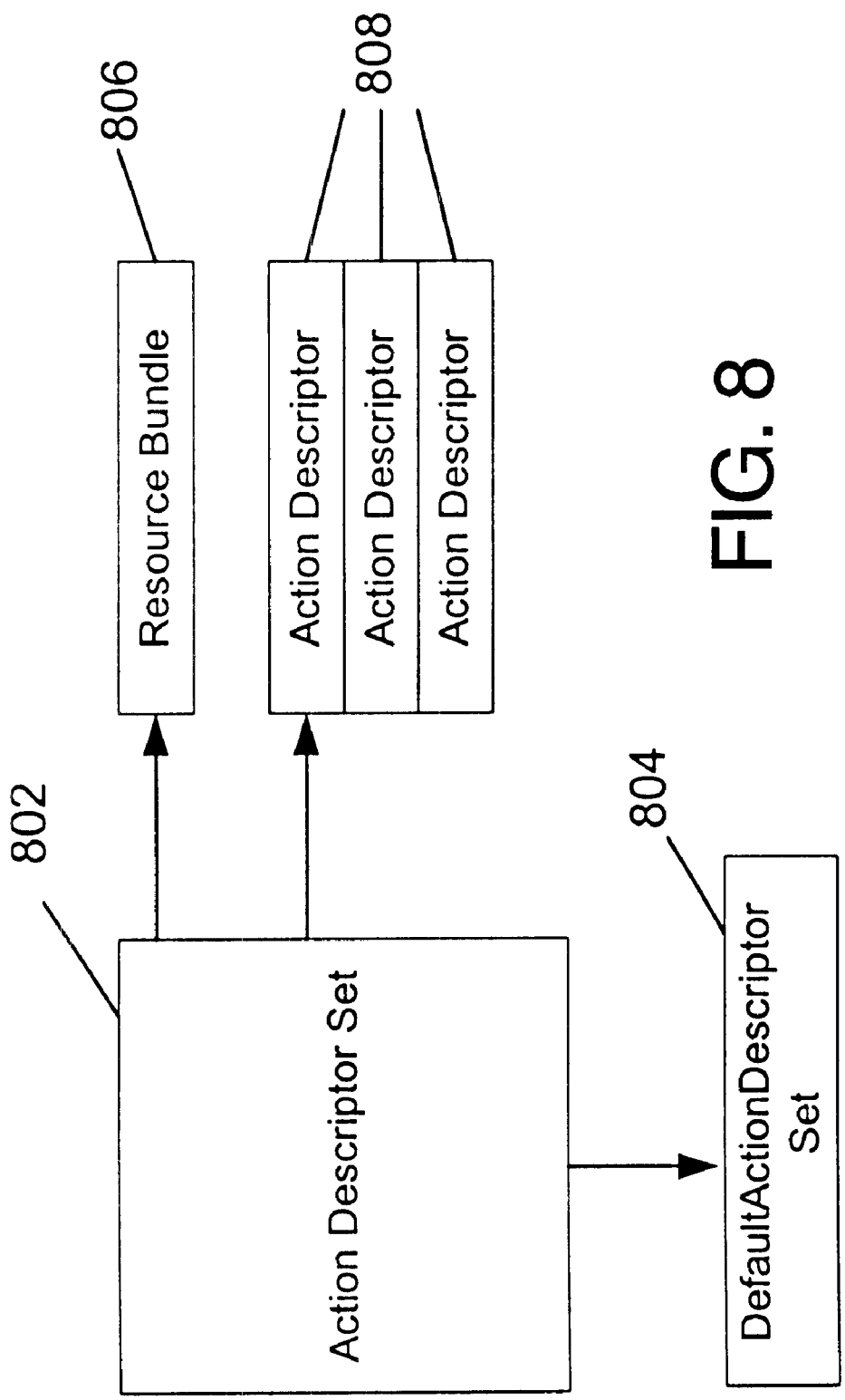
FIG. 8 is a block diagram of the ActionDescriptorSet utilized in FIG. 7.

In step 706, in the illustrative embodiment, the action bar contents, display and behavior are defined by a set of records known as Action Descriptors 808 and are shown in FIG. 8. Action Descriptors 808 may be implemented as a class which defines their Action Descriptors 808 as a static array of strings. Alternatively, these descriptors may be read from resource files.

The set 802 of Action Descriptors 808 included in the applet UI is specified in the applet's User Interface by the applet designer. External application developers can customize the user interface of an applet by editing the Action Descriptor Set 802.

ActionDescriptorSet

An ActionDescriptorSet (ADSet) 802 is an object which contains a collection of action descriptors (AD) 808 and the resource information in resource bundle 806 that is associated with the action descriptors. ADSets are used by Info-Center clients to load, store and manage a client's ADs. It is also integral to the IC customization features. The Ads 808 in an ADSet 802 are accessed using the action ID for a given action descriptor as a key. An ActionDescriptorSet 802:

Contains a collection of action descriptors 808 and the resource information in bundle 806 to resolve resource references in the action descriptors 808.

Used by InfoCenter clients to load, store and manage a client's ActionDescriptors 808.

An ActionDescriptor 808 is an object which describes: how to execute an action and the elements of the action's UI representation in the InfoCenter. Action execution is specified by the type of ActionDescriptor 808, and if applicable certain fields of the action descriptor (see Format Of Action Descriptor Strings and Field Values For Different Action Descriptors). Each ActionDescriptor 808 has a reference to the ActionDescriptorSet 802 that created it.

ActionDescriptorSets 802 are stackable. When a request for an ActionDescriptor 808 is made, the ActionDescriptorSet 802 looks for the specified ActionDescriptor 808 in its collection of ActionDescriptors. If it does not find the specified ActionDescriptor in its collection, it passes the request to its default ActionDescriptorSet 804. This enables two features: sharing common ActionDescriptors and implementing IC customization.

Figure 9:
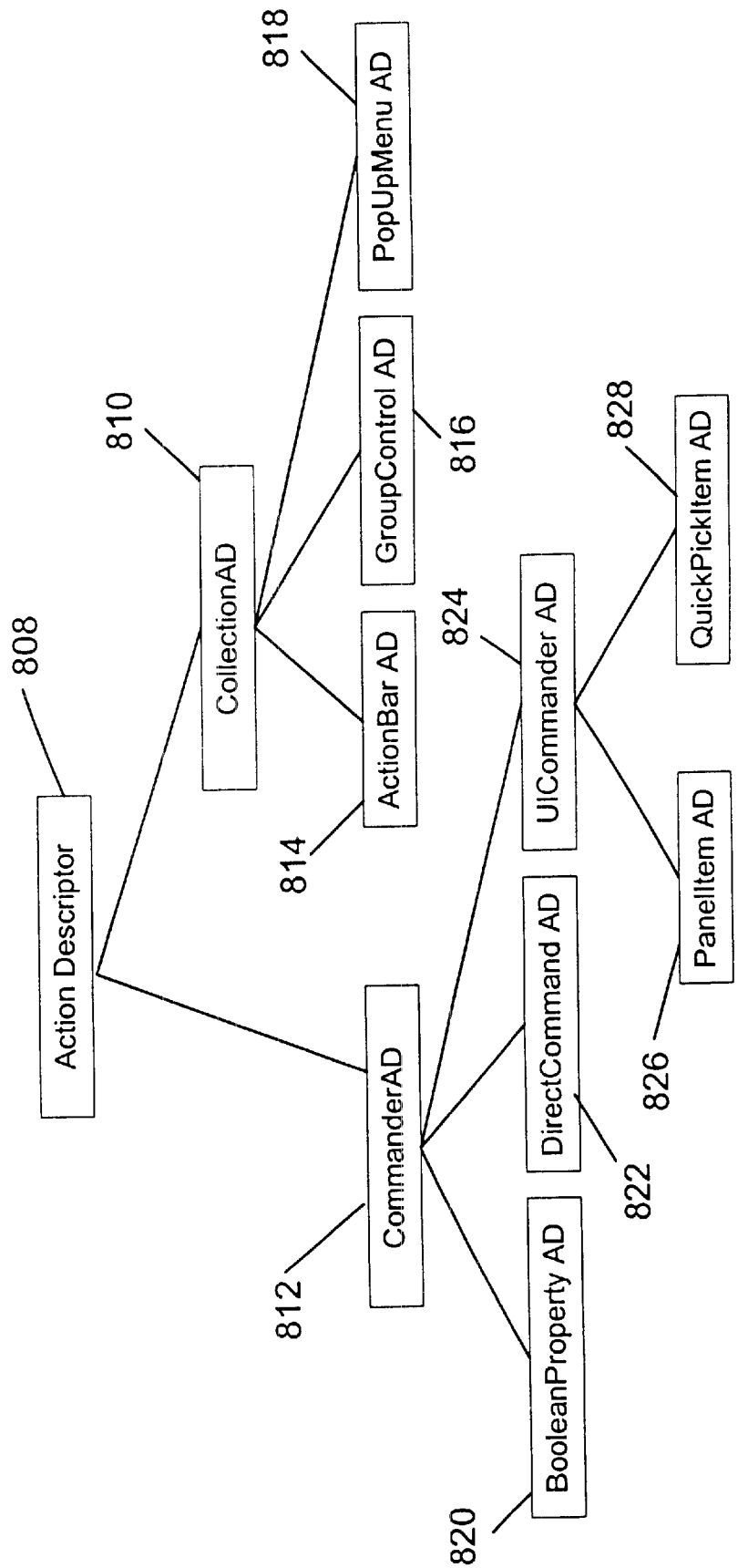
FIG. 9 is a block diagram of the Action Descriptor of FIG. 8 according to the present invention.

There are several types of action descriptors. The following diagram in FIG. 9 shows the relationship among the different types of action descriptors:

That is to say: all ActionDescriptors 808 derive from ActionDescriptor. All collections of Action Descriptors derive from CollectionAD 810, and there are three such classes: ActionBarAD 814, GroupControlAD 816, and PopupMenuAD 818. All Action Descriptors 808 for Commanders derive from CommanderAD 812, and number three: BooleanPropertyAD 820, DirectCommandAD 822, and UICommanderAD 824. All Commanders with UI derive from UICommanderAD 824, and number two: PanelItemAD 826 for panels, and QuickPickItemAD 828 for Quick-Picks.

Each ActionDescriptor 808 is a String with the following format (<n> indicates a field, which can be any text):

<1>=<2>, <3>, <4>, <5>, <6>, <7>, <8>

The meaning of each field is described below:

<1> Action ID is a string which identifies an action descriptor in an action descriptor set. (e.g. IDA_CUT, IDA_SAVE)

<2> Action Type is a string which specifies the type of action descriptor this string describes. (e.g. direct, popup, propertypanel)

<3> Commander Classname or Contents List—The meaning of this field depends on the type specified in field #2. For action descriptors which derive from CommanderAD, this field specifies a class name for the Commander to be used to execute the action. (e.g. lotus.fc.ichelpers.FileCommander) For CollectionADs, this field contains a vertical bar (|) delimited list of Action IDs. This list of Action IDs describes which action descriptors are contained in the CollectionAD. (e.g. IDA_CUT|IDA COPY|IDA_PASTE)

<4> Commander ID For Action—Commanders define IDs for all of the actions and properties it knows how to execute. This field contains the string version of this ID. This string is passed to the Commander. The Commander then returns a corresponding integer ID for the action. The integer ID is then used as the action identifier for the rest of the Commander interface. (e.g. ID_CUT, ID_PRINT)

<5> Resource Reference For User Visible Name is a field that contains the reference into a resource bundle for the user visible name. The user visible name is the string which is displayed in the action bar or popup menu for the action. (e.g. IC_AD_STR_GRP_CUT, IC_AD_STR_EDIT) (see Resolving Resource References For Action Descriptors)

<6> Resource Reference For Image Filename is a field containing the reference into a resource bundle for the image filename. The image is only used when an action sits directly on the action bar. When an action is contained within a group control or a popup menu, this field is ignored. (e.g. IC_AD_IMG_SAVE, IC_AD_IMG_OPEN) (see Resolving Resource References For Action Descriptors)

<7> Resource Reference For UI Filename (PropetyPanelAD, CommandPanelAD, QuickPickItem)—The InfoCenter can host UI from a client like a quickpick, a command panel, or a property panel. This UI is obtained from a UICommander by providing an identifier to the UICommander. Traditionally, this identifier has been a filename for the persisted version of a UI, namely a Bongo GUI file. Due to remnants of an earlier InfoCenter architecture, this field is a resource reference into a resource bundle. (e.g. IC_AD_GUI_TEXTSTYLE)

<8> Resource Reference For Long Description (Optional/Not Implemented)—If bubble help is supported by the InfoCenter, this optional field can be added to an action descriptor to supply the text for the bubble help. This field is parsed and made available through the ActionDescriptor class, but it is not used in the current implementation of the InfoCenter.

Each type of Action Descriptor 808 makes differing use of the fields in an Action Descriptor as follows:

The ActionBarAD 814 record type assigns these meanings to the fields:
  <1> ActionID
  <2> "actionbar"
  <3> Contents List
  <4> "null"
  <5> "null"
  <6> "null"
  <7> Not used
  <8> Not used The GroupControlAD 816 record type assigns these meanings to the fields:
  <1> Action ID
  <2> "group"
  <3> Contents List
  <4> "null"
  <5> User Visible Name (optional)
  <6> "null"
  <7> Not used
  <8> Not used The PropertyPanelAD record type assigns these meanings to the fields:
  <1> Action ID
  <2> "panel" or "propertypanel"
  <3> Commander Classname
  <4> Commander ID For Action
  <5> User Visible Name
  <6> Image Filename (optional)
  <7> UI Filename
  <8> Not used The CommandPanelAD record type assigns these meanings to the fields:
  <1> Action ID
  <2> "commandpanel"
  <3> Commander Classname
  <4> Commander ID For Action
  <5> User Visible Name
  <6> Image Filename (optional)
  <7> UI Filename
  <8> Not used The PopupMenuAD 818 record type assigns these meanings to the fields:
  <1> Action ID
  <2> "popup"
  <3> Contents List
  <4> "null"
  <5> User Visible Name
  <6> "null"
  <7> Not used
  <8> Not used The QuickPickItemAD 828 record type assigns these meanings to the fields:
  <1> Action ID
  <2> "quickpick"
  <3> Commander Classname
  <4> Commander ID For Action
  <5> User Visible Name
  <6> Image Filename (optional)
  <7> UI Filename
  <8> Not used The DirectCommandAD 822 record type assigns these meanings to the fields:
  <1> Action ID
  <2> "direct"
  <3> Commander Classname
  <4> Commander ID For Action
  <5> User Visible Name
  <6> Image Filename (optional)
  <7> Not used
  <8> Not used The BooleanPropertyAD 820 record type assigns these meanings to the fields:
  <1> Action ID
  <2> "boolean"
  <3> Commander Classname
  <4> Commander ID For Action
  <5> User Visible Name
  <6> Image Filename (optional)
  <7> Not used
  <8> Not used When an ActionDescriptor 808 needs to resolve a resource reference, it asks its ActionDescriptorSet 802 for its ResourceBundle 806 (FIG. 7) and accesses the resource through ResourceBundle API.

For resourced URLs, the locale and resource base which are stored in the ActionDescriptorSet are used in conjunction with the ResourceBundle's resource value for that key.

As mentioned above there is a set of SharedActionDescriptors provided by the InfoCenter client helper code (lotus\fc\ichelpers\SharedAction Descriptors.properties). This set is loaded by the InfoCenter module. Applet teams may reference records defined in the shared set in their menu or actionbar lists.

There are three special descriptors defined in SharedActionDescriptors.properties:

ActionID Meaning
IDA_SEP used in action bar lists to indicate that a visual separator should be placed between items.
IDA_MENU_SEP used in menu content lists to indicate that a visual separator should be placed between items.
IDA_POPUPICON used to indicate the bitmapped image to be used for the icon for popup menus displayed on the InfoCenter.

Several of the strings specified in the ActionDescriptors are user-visible. In the illustrative embodiment, the whole action descriptor set may be resourced to keep all the text, descriptors and gif file names together.

In step 708 of the illustrative embodiment, the Commander and UICommander classes provide the mechanism for translating the id-based information provided by the InfoCenter UI to the applet code that handles a command or gets/sets a property.

When a user clicks on an actionbar button, the InfoCenter will instance the associated Commander/UICommander class by name. It then sets the selection object on the Commander class. The selection object provides the hook into the Applet that the Commander needs. Then depending on the action type, it either calls doCommand, get/setProperty or CreateUI.

The designer's implementation of the Commander methods can handle commands and property setting in any way selected by the designer. Preferably, however, the designer calls into the applet using interfaces that can be exposed via the script model.

The Commander interface is defined as follows:
public interface Commander
{
    public abstract Object doCommand(int id);
    public abstract Object doCommand(int id, Object arg);
    public abstract Object getProperty(int id);
    public abstract void setProperty(int id, Object value);
    public abstract Object getPropertyOptions(int id, int optionType);
    public abstract int getIDFromString(String idString);
    public static final int UNKNOWN_ID=−1;
    public static final int ID_CLOSE=−2;
    public static final int ID_CANCEL=−3;
    public static final int ID_OK=−4;
    public abstract void setSelection(Selection selection);
    public abstract Selection getSelection( );
    public abstract void setCommanderOwner (CommanderOwner co);
    public abstract CommanderOwner getCommanderOwner( );
}

The doCommand(int id) method is called when a user chooses a button or menu item whose type is "direct" or a LotusCommandButton widget in a panel. The CommandId string specified in the Action Descriptor is translated to an integer and passed as the argument.

The getProperty(int id) method gets the property value from the applet. The widget name string specified in the Bongo.gui file is translated to an integer and passed as the id argument. The method is used to set widget values when a panel is instanced or to get the current value of a boolean property for toggling.

The getProperty(int id) method sets the property value in the applet. The widget name string specified in the Bongo .gui file is translated to an integer and passed as the id argument. The method is used to set property values when a widget value changes or boolean button is clicked.

The getPropertyOptions(int id, int optionType) method gets property information from the applet. The widget name string specified in the Bongo .gui file is translated to an integer and passed as the id argument. There are several optionTypes currently defined:

MIN provide the minimum value for this property
    MAX provide the maximum value for this property
    AVAILABLE specify whether this property or command is currently available (indicates whether to enable a widget or not—also used for enabling/disabling action bar items and menu items)
    LEGALVALUES provide a list of values for this property; used for listbox widgets The setSelection(Selection selection) method is called by the InfoCenter to provide the selection object to the Commander. The selection object provides the hook the Commander needs to the Applet.

The getselection( ) method returns the current selection object.

The getIDFromString(String idstring) method is called by the InfoCenter to translate string-based ids to integer ids. Applet-defined ids should be greater than or equal to zero.

The int ID_CLOSE static integers provide default id's for standard panel buttons. If a Commander class is derived from DefaultCommander, then these ids may be used to provide default handling of buttons widgets whose name is set to "OK", "CLOSE" or "CANCEL". The button name may differ from the button label.

The setSelection method is called to set the Selection interface into a Commander. Similarly, getSelection retrieves the last Selection interface received by call to setSelection. The InfoCenter listens on the InfoBus for Selection, and uses these methods to manage the current Selection.

The setCommanderOwner method identifies an Object implementing the CommanderOwner interface. GetCommanderOwner retrieves the last CommanderOwner interface passed to setCommanderOwner. CommandOwner is an interface describing services the owner (creator) of a commander can provide. This interface should be supported by the class which provides the UI context for the commander, and is defined as follows:
    public interface CommanderOwner
    {
        public java.awt.Frame getFrame( );
    }

Since getFrame returns an AWT Frame that the commander can use to display dialogs, the InfoCenter sets itself as the CommanderOwner, and uses a method in lotus.util.Util.getFrame to get the containing Frame for the InfoCenter to host all Commander-generated dialogs. The CommanderOwner interface is the way that the InfoCenter can control the hosting of all AWT dialogs.

The UICommander interface extends the Commander interface and provides the ability to display additional user interface elements, i.e. panels and quick-picks. The UICommander interface is defined as:
    public interface UICommander extends Commander
    {
        public abstract Component createUI (UICommanderOwner owner, String id);
        public abstract void updateUI( );
        public abstract void updateUI(int id);
        public void destroyUI(Component c);
    }

The createUI (UICommanderOwner owner, String id) method is called when a user chooses a button or menu item whose type is "panel" or "quickpick". The owner is the InfoCenter and the id is the name of the UIFile specified in the ActionDescriptor for the button or menu item. If using Bongo, the UIFile will be a .gui file, but the interface doesn't require that. The updateUI( ) method is called to update the values of all the widgets shown in the UI. The updateUI(int id) method is called to update a particular widget shown in the UI. The destroyUI(Component c) method is called to release any resources that the component may be using. The parameter c is the component to be destroyed.

OVERVIEW OF COMMUNICATION BETWEEN INFOCENTER AND CLIENT

Elements of InfoCenter-Client Communication

InfoBus is used to share data among Java applications without a tight binding between the data provider and the data consumer.

lotus.ic.client.Selection is an interface implemented by an InfoCenter client. An implementation of this interface provides information about the current selection in the client.

lotus.ic.client.SelectionContext stores various parameters for a selection assertion are stored in an instance of this class before it is placed in a SelectionDataItem.

lotus.ic.client.SelectionDataItem is a named InfoBus data item which transports the SelectionContext object from the client to the InfoCenter.

lotus.ic.client.UserInterfaceState generates objects used to store information pertaining to the current state of the InfoCenter's UI. Typically, this state is saved by a client so that the UI can be restored at a later time.

lotus.ic.client.ICClientPreLoader is an interface implemented by an InfoCenter client. If a client would like the opportunity to preload certain resources to make their run-time performance more efficient, the client can implement this interface and set it in the SelectionContext object. During SelectionContext processing, the InfoCenter will exercise this interface to notify the client that preloading may begin. Typically, preloading should occur on a separate thread so that the InfoCenter is not blocked.

lotus.fc.util.RefreshThread is a thread used to process SelectionContext objects which are stored in the SelectionContext queue.

lotus.ic.ICActionProcessor is a class used to queue actions which need to be executed on the current selection. This class encompasses the storage of the actions and the thread handling for the queue.

lotus.ic.client.ActionBarAD is a type of ActionDescriptor which defines the contents and the look of the InfoCenter's action bar. The InfoCenter obtains the appropriate action bar information by retrieving the ActionBarAD from the client's Selection implementation.

lotus.ic.client.PanelItemAD is a type of ActionDescriptor which specifies that an action is to be used to launch an InfoCenter panel.

lotus.ic.client.Commander is an interface implemented by an InfoCenter client. The InfoCenter gets an instance of a Commander from the current Selection. This interface allows the InfoCenter to execute actions in the client.

lotus.ic.client.UICommander is an interface implemented by an InfoCenter client. The InfoCenter gets an instance of a UICommander from the current Selection. This interface extends Commander interface and is used to obtain UI which should be hosted by the InfoCenter.

Description Of Initial Rendezvous Between InfoCenter and Client

An InfoCenter and a client achieve their initial rendezvous via a named InfoBus using a named data item. The default value for the named InfoBus is "%LotusInfoCenterBus%". The value for the named data item is "%LotusSelection%".

When a client is ready to surface its UI in the InfoCenter, it sets its relevant implementation of the Selection interface into a SelectionContext object. It then sets any other appropriate parameters based on the desired behavior of the InfoCenter. The SelectionContext object is set into a SelectionDataItem object. Finally, the SelectionDataItem object is placed on the named InfoBus.

The InfoCenter registers with the named InfoBus as a listener for the named data item. In the event that a named data item was placed on the bus before the InfoCenter was created, the InfoCenter looks for any relevant data item objects during initialization.

When a named data item is found by the InfoCenter, the InfoCenter extracts the SelectionContext object from the data item and processes the object.

Determining The SelectionContext Type

When a new SelectionContext object is received, the InfoCenter first checks what the type property of the SelectionContext object. There are three types: SC_NEW_SELECTION, SC_SAVE_STATE, SC_HIDE_UI.

If the type property is SC_NEW_SELECTION, the new SelectionContext is placed in the SelectionContext queue for normal processing. This type of property is used when refreshing the InfoCenter UI, restoring a saved user interface state, or asserting to perform an action.

If the type property is SC_SAVE_STATE, the InfoCenter saves the current state of the user interface in a UserInterfaceState object which is set into the SelectionContext object. The SelectionContext object is not placed in the SelectionContext queue. The SC_SAVE_STATE type is used during task switching in the Lotus WorkPlace. Applets were responsible for saving and restoring their state during task switches.

Finally, if the type property is SC_HIDE_UI, the InfoCenter hides itself and clears its internal state.

Description Of SelectionContext Queue And ICActionProcessor Queue

There are two queues each with their own threads in the InfoCenter: 1) SelectionContext queue, and 2) ActionProcessor queue.

The SelectionContext queue queues SelectionContext objects and is serviced by the RefreshThread. However, this queue does not process all SelectionContext objects equally. There are two designations for SelectionContext objects in this queue: (1) with actions to execute and (2) without actions to execute.

If a SelectionContext has an action to execute, the object is placed in a FIFO queue. All SelectionContext objects with actions are processed in the order that they are received. SelectionContext objects without actions are stored in a 1-element queue. If a SelectionContext object without an action comes into the InfoCenter and one of these already occupies the 1-element queue, the new SelectionContext object replaces the current object. In the illustrative embodiment, all SelectionContext objects are processed before any without actions.

Processing Of SelectionContext Queue

Before a new SelectionContext can be processed, any pending actions on the current SelectionContext (SC) must be executed. Therefore, processing of a new SelectionContext blocks until the ICActionProcessor is empty. The first thing that happens when the new SC is being processed is to determine whether the client should be notified to preload any resources. This result is saved until later in the process. The client is not notified to preload at this point. Next, the new SC is set as the current SC and a determination is made to whether the new SC is null. If null, the state of the InfoCenter is cleared. If the SC is not null, the InfoCenter is made visible and processing of the client's Selection implementation begins.

At this point, the action bar of the InfoCenter is updated. If the action bar which is showing does not pertain to the new selection, the action bar is updated using the ActionBarAD from the Selection. If the current action bar is valid for the new selection, the values for the action bar are refreshed.

Next, the InfoCenter makes some decisions about InfoCenter panels. An InfoCenter panel is a panel which is created by the client and is hosted in the InfoCenter's layout. Typically, these panels fall into one of two categories: command panels and property panels. Command panels are like dialogs. Their distinctive feature is that the values entered into this type of panel do not take effect until the user chooses an OK button (or some equivalent) on the panel. A property panel acts much like an InfoBox panel. The controls on this panel update the client immediately after being adjusted.

With regards to SelectionContext processing, the InfoCenter first decides whether the new SC has a UserInterfaceState to restore, and, if so, the rest of the panel logic is skipped. If the SC does not have a UserInterfaceState to restore, the InfoCenter decides whether the new SC has an ActionDescriptor to execute and whether that ActionDescriptor is a PanelItemAD. If there is an ActionDescriptor and it is a PanelItemAD, the rest of the panel logic is skipped. If not, then the InfoCenter decides whether an InfoCenter panel is currently showing. If a panel is not showing, then the rest of the panel logic is skipped. If a panel is showing, the InfoCenter checks whether the current panel is supported by the new selection, and, if so, its values are updated and the rest of the panel logic is skipped. If it is not supported, the InfoCenter determines whether the current panel is a property panel. If it is not a property panel, the current panel is closed. If it is a property panel, the InfoCenter will replace the current property panel with the default property panel for the current selection. The InfoCenter gets the default property panel by retrieving the defaultPropertyPanelAD property from the client's Selection implementation. This ActionDescriptor is used to launch the default property panel.

If the new SC had a UserInterfaceState to restore, that would be done at this point. Then, if the SC had an ActionDescriptor to perform, the action would be placed in the ICActionProcessor queue.

Finally, if the InfoCenter determined that the client should be notified to preload resources, the client is notified at this point. This notification happens through the ICClientPreLoader interface. If a client would like the opportunity to preload UI resources, the client can implement the ICClientPreLoader interface. This implementation is then set into the SelectionContext prior to selection assertion. The InfoCenter gets the ICClientPreLoader implementation from the SelectionContext and notifies the client that preloading can begin. In general, it is recommended that the actual preloading of resources take place on a separate thread. Having finished processing the new SelectionContext, the RefreshThread returns.

Processing Of ICActionProcessor Queue

The ICActionProcessor queue is a basic FIFO queue. Actions are executed in the order that they are placed in the queue. When the queue is empty, the thread which services the ICActionProcessor queue waits. All actions are funneled through a central point in the InfoCenter where based on the ActionDescriptor type the action is dispatched to the appropriate handler. A handler exists for every type of Action Descriptor.

Some types of action execution require interaction with the client. This interaction takes place through the Commander interface. ActionDescriptors which derive from CommanderAD use the Commander interface to interact with the client. There are two types of actions which can be executed through the Commander interface: commands and properties. The Commander interface allows the InfoCenter to get/set a property's value, get a list of supported values, and determine if the property should be enabled in the UI. For commands, the InfoCenter can execute a command and determine if the command should be enabled in the UI.

Sometimes an action requires even more information from a client. For instance, actions which launch user-defined UI must be able to obtain the UI from the client. This level of interaction takes place through the UICommander interface. The UICommander interface allows the InfoCenter to obtain an AWT Component from the client which can be hosted in the InfoCenter's layout. Since the UICommander interface extends Commander, all of the same functionality which is exposed through Commander is also available through UICommander.

A Helper for InfoCenter-Client Communication

Much of the InfoBus communications associated with asserting a selection has been encapsulated in lotus.ic.client.ICClientHelper. This helper class allows a client to set a few parameters and exercise a few methods to perform selection assertion.

Focus Issues

Hence, a focus management system was created to centralize focus dependencies. This centralization takes place through a focus proxy. When the InfoCenter receives focus for any reason, the focus is passed to the focus proxy. This proxy is represented by an interface, lotus.ic.ICPopupFocusProxy. This interface is implemented by a class, ICPopupFocusProxyImpl. This implementation takes an AWT Component which is the entity that actually retains the focus.

AWT Window Considerations (Popup Menus & Quickpicks)

AWT windows are used to host InfoCenter popup menus and quickpicks. Unfortunately, AWT window implementations across platforms may be inconsistent. The InfoCenter identifies the current platform so that windows can be created appropriately. In most cases, windows can be created normally by instantiating a Windows object; however, NCD 2.5 (and Window32 platform) and Sun's JavaStation both have issues with creating and showing windows.

For NCD 2.5 windows needed to be created as early as possible. To do this, Window objects needed to be created before any other AWT Components and kept in a cache so that the windows would appear on top of the other components. Therefore, when running under NCD, the InfoCenter creates a cache of windows and performs some special initialization so that the Windows appear.

The Sun JavaStation does not have the z-order problem. However, it does exhibit the problem with not appearing on the first show. Therefore, the InfoCenter does not cache windows on the JavaStation, but it does perform the special initialization.

Keyboard Shortcut Support

Each client creates a table which associates a semantic to an ActionDescriptor's action ID. The client then defines in their resource bundle a mapping between the semantic and a locale specific key sequence. These are read into the lotus.ic.client.KeyEventTranslator. When a client receives a key event, it is passed into the translator and an ActionDescriptor is returned. This ActionDescriptor represents the action which should be executed. The client then uses lotus.ic.client.ICClientHelper to assert a selection to perform an action passing the ActionDescriptor from the translator. The InfoCenter will then act upon this new selection.

InfoCenter Customization

InfoCenter customization allows a DevPack developer to turn-off items in an applet's InfoCenter UI. For instance, actions that appear in the action bar or popup menus can be removed using the ICCustomizer which is launched from TemplateBuilder.

The InfoCenter uses ActionDescriptorSets in a "stackable" fashion. What this means is that if a request comes into an ActionDescriptorSet for a particular ActionDescriptor, it will look in its own hashtable. If it does not have the requested ActionDescriptor, it passes the request onto its default ActionDescriptorSet. This continues until there are no more ActionDescriptorSets in the chain.

The InfoCenter Customizer tool is used to achieve InfoCenter customization. The InfoCenter Customizer tool retrieves an applet's design-time ActionDescriptorSet. When the user selects which items should not appear in the InfoCenter UI, the tool creates a run-time ActionDescriptorSet which has the design-time ActionDescriptorSet as its default. All ActionDescriptors in the InfoCenter UI are organized by CollectionADs. CollectionADs are ActionDescriptors which have references to other ActionDescriptors. For instance, a menu is represented by a PopupMenuAD where the references to other ActionDescriptors are used as the contents of the menu. If the user turns off an item in the menu, the tool creates a copy of the PopupMenuAD and modifies its list of ActionDescriptors so that it does not contain the item or items which were turned off by the user. The tool then places this new CollectionAD in the run-time ActionDescriptorSet. When the user is finished with the tool, the run-time ActionDescriptorSet is serialized to an .ICC file.

Logic is built into LFCApplet to determine which ActionDescriptorSet to use. If a .ICC file is specified, LFCApplet deserializes the run-time ActionDescriptorSet.

Support Classes

There are several classes that provide useful default behavior. These classes can be extended and just provide applet-specific code.

DefaultCommander—provides default implementations for all Commander methods. While several of the default implementations are empty, the following methods are useful for applet teams.

setSelection set the member variable m_selection getSelection returns m_selection getIDFromString The default implementation handles the strings CLOSE, OK and CANCEL. In addition, it will search an array of strings and return the index into that array. To use this implementation, the commander class defines the id strings in a static array and defines the associated ids to be the index into that array. getIDFromString will call a DefaultCommander class method that you must override: getIDStrings. The getIDStrings then returns the static array of strings.

There are also two convenience methods provided that Commanders can use to find an object that handles a specified command. Both of these methods require that the designer override doCommandTo in the defined commander class.

The boolean walkSelectionHierarchy (int id) method takes an integer id which is the Command Id and returns a boolean indicating whether it found a handler for the command. The method walks up the owner hierarchy of the Selection and then the visual hierarchy, calling doCommandTo, until doCommandTo returns true or it reaches the top of the hierarchies.

The boolean walkVisualHierarchy (Object object, int id) method takes an object which should be a component and an integer id which is the Command Id. It returns a boolean indicating whether it found a handler for the command. The method walks up the visual hierarchy of the object, calling doCommandTo, until doCommandTo returns true or it reaches the top of the hierarchy. (Note: walkSelectionHierarchy calls walkVisualHierarchy.)

The boolean doCommandTo (Object object, int id) method takes an object and an integer id which is the Command Id. It returns a boolean indicating whether it handled the command. The implementation in DefaultCommander always returns false. If applets want to use this searching mechanism in their commanders they must override this method.

The DefaultUICommander abstract class provides default implementations for the UICommander updateUI methods and provides two other useful methods: destroyUI( ) and getUIPanel( ). The createUI method is not defined in this class, but in a class that knows what kind of UI to create (see BongoUICommander).

updateUI( ) calls the updateUI method on the current panel.

updateUI(id) calls the updateUI(id) method on the current panel destroyUI( ) called by InfoCenter when a panel or popup is going away getUIPanel( ) called by UICommander classes that need to get the widget values directly from a panel. This is useful for getting panel values that are arguments to commands rather than property values.

The BongoUICommander class extends DefaultUICommander and provides the createUI method that knows how to create Bongo Panels. Most applet UICommanders extend this class.

The ClipboardCommander class extends DefaultCommander and overrides doCommand to provide default handling for cut, copy and paste commands. To use this class the selection, or an object in the selection owner chain, must implement the lotus.fc.ichelpers.ClipboardUser interface. A reference is needed to the Action Ids, IDA_CUT, IDA_COPY and IDA_PASTE from SharedActionDescriptors.properties in the menu and actionbar descriptors of the action descriptor set.

The TextStyleUICommander class extends BongoUICommander and overrides the get/setProperty methods, and getPropertyOptions. It provides default handling for the following properties:

FontName

Font

Size

Bold

Italic

Color

Alignment

To use the TextStyleUICommander class, a selection, or an object in the selection owner chain, must implement the lotus.fc.style.TextStyle interface. The designer can add Bold, Italic, Alignment or Color buttons to your action bar by specifying the Action Ids, IDA_BOLD, IDA_ITALIC, IDA_TEXTALIGN and IDA_TEXTCOLOR from SharedActionDescriptors.properties. If the default text style panel is used that is defined in textstyle.gui, the designer can also use the IDA_TEXTSTYLE action id specified in SharedActionDescriptors.properties.

Some applets may want to use commander classes provided by the infrastructure team, but need to augment the behavior to handle additional commands or properties. Alternatively, the designer can modify the handling in the base class of one or more properties or commands. Rather than rewrite the commander from scratch, the designer can derive the commander from the one provided in lotus.fc.ichelpers. There are a few considerations the client must consider when doing so.

The InfoCenter will call super.getProperty or super.setProperty for any properties handled by the superclass from the get or setProperty method. Similarly with doCommand and getPropertyOptions.

To avoid id value conflicts, there must be a static final int defined which indicates the value of the last id used by the base commander class. For example, the ids used by the TextStyleUICommander are defined in lotus.fc.style.textstyle.java. A special value, lotus.fc.style.TextStyle.TEXTSTYLE_LAST_ID, is defined that indicates the value of the last id used by TextStyleUICommander. The designer can define property and command ids in the default class by adding to that value.

If the default getIDFromString and override getIDStrings are used, the id array used is merged in the base Commander class, with the static array to return the full set. For an example of a derived commander class, see lotus.wp.ui.WPTextStyleUICommander.

Panels with Tabs

Many of the panels designed by Lotus for applets contain more than one page or tab. The designer can define a separate UICommander class to handle the properties on each page. This is especially useful when a tabbed panel contains standard panels plus some applet-specific panels. The shared commander class can be used for standard tabs and the commander can be written to handle the properties on the additional panels.

The new way to specify the commander for a page within a tabbed panel is to create a LotusCommandButtonWidget on the. page with the following properties:

name is COMMANDER.

label is the name of the commander for the page. e.g. lotus.sheet.SheetCommander mode is invisible bounds are 0,0,5,5 (so they may be found)

Command Panels

Some panels in the UI are much like dialog boxes in suite applications. The widgets in the panel are not associated with properties, but rather provide arguments to a command. To implement one of these panels, one must:

1. use either standard or lotus-specific widgets for the arguments widgets
2. name all argument widgets
3. use a LotusCommandButton for the OK (or Done) button
4. give the OK button a unique name for this command When the user clicks on the OK button, the InfoCenter calls the defined commander's doCommand method, passing in the id associated with the OK button name (as returned from getIDFromString). In a modified doCommand method, getUIPanel method can be called to get the panel object. The widget value for each argument widget can be obtained from the panel.

Some panels contain a set of buttons which together act as a choice control. These buttons should be grouped into a LotusButtonGroupWidget. The defined commander is called at the setProperty method for the group. The value of the widget is the name of the selected button widget. The InfoCenter translates the name of the LotusButtonGroupWidget via getIDFromString so the user defined commander must be able to interpret the button name for the group widget value.

Property Changes From the Applet

When the user changes a property in the applet via direction manipulation (e.g. ctrl-B to set text bold), the InfoCenter must update its UI to reflect the new state of the selection. Currently, the way to inform the InfoCenter of this change is to re-assert the selection.

Resource File Locations

The set of shared .gui and .gif files are located in lotus\fc\ichelpers\res. The user should put the applet-specific resource files in a "\res" subdirectory of the directory where the user keeps the commander classes.

In the action descriptors, the user can specify path locations (relative to CODEBASE) for the Bongo .gui files (using '\' as a separator). However, this makes the action descriptors harder to read. If only the file name is specified, the BongoUIPanel code uses the following search method:

Step 1. Search in CODEBASE, using the commander classname plus "res"

Step 2. Search in CODEBASE again, using the classname of the commander's superclass plus "res"

Step 3. Continue up the superclass hierarchy as described until one is found or it reaches the top of the tree.

This way UICommanders can use the .gui files of their superclass. Currently, gif files default to lotus\fc\ichelpers\res if no path is specified.

As set forth previously, object-oriented technology forms the basis for the InfoBus architecture 200 of the present invention. For the purpose of the illustrative embodiment, components are essentially Java objects that conform to the Java Beans and Java specifications.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A method for providing a user interface to applet members within a Java virtual machine (JVM) having an information bus that allows direct communication and data sharing between applet members of the information bus, the method comprising the steps of:

(a) making a general user interface a member of the information bus;

(b) in response to an announcement from an applet member of the information bus, querying the applet member regarding all specified requirements for the user interface for the applet member;

(c) transmitting to the general user interface the requirements of the user interface for the applet member;

(d) generating the applet member user interface based on the requirements transmitted to the general user interface and prior to any subsequent interaction with the applet member user interface by a human user.

2. The method of claim 1 further comprising the steps of:

(e) issuing a user interface change request by the applet member to the general user interface;

(f) performing the change request upon the applet member for customizing the applet member user interface.

3. The method of claim 1 wherein the general user interface is a base object and each applet member interface is an instance class of the general user interface base object.

4. The method of claim 1 wherein step (d) includes:

(d1) generating an action bar; and (d2) generating a plurality of menu items based on the requirements of the applet member.

5. The method of claim of claim 4 further comprising:

(d3) implementing a set of graphical user interface panels.

6. The method of claim 4 wherein the action bar is designed for a work file environment.

7. The method of claim 4 wherein the action bar is designed for a web browser environment.

8. The method of claim 4 wherein the step (d2) includes:

(d5) preparing a popup menu for a portion of the plurality of menu items.

9. The method of claim 1 wherein step (d) comprises:

(d4) invoking selected action descriptors to generate the applet member user interface.

10. The method of claim 1 wherein step (d) comprises:

(d6) generating a quick-pick item to select a widget.

11. A computer program product to provide a user interface to applet members within a Java virtual machine (JVM) having an information bus that allows direct communication and data sharing between applet members of the information bus the computer program product comprising computer usable medium upon which program code is stored, comprising:

program code to make a general user interface a member of the information bus;

in response to an announcement from an applet member of the information bus, program code to query the applet member regarding all specified requirements for the user interface for the applet member;

program code to transmit to the general user interface the requirements of the user interface for the applet member;

program code to generate the applet member user interface based on the requirements transmitted to the general user interface and prior to any subsequent interaction with the applet member user interface by a human user.

12. The computer program product of claim 11 further comprising:

program code to issue a user interface change request by the applet member to the general user interface;

program code to perform the change request upon the applet member for customizing the applet member user interface.

13. The computer program product of claim 11 wherein the general user interface is a base object and each applet member interface is an instance class of the general user interface base object.

14. The computer program product of claim 11 wherein the generating program code includes:

program code to generate an action bar; and program code to generate a plurality of menu items based on the requirements of the applet member.

15. The computer program product of claim 14 further comprising:

program code to implement a set of graphical user interface panels.

16. The computer program product of claim 14 wherein the action bar is designed for a work file environment.

17. The method of claim 14 wherein the action bar is designed for a web browser environment.

18. The computer program code of claim 14 further comprising:

program code to prepare a popup menu for a portion of the plurality of menu items.

19. The computer program product of claim 11 wherein the generating program code comprises program code to invoke selected action descriptors to generate the applet member user interface.

20. The computer program code of claim 11 further comprising program code to generate a quick-pick item to select a widget.

21. A method for dynamically generating a user interface in a network computer environment comprising the steps of:

receiving an announcement of a user object selection from an application;

querying the selection object for a user interface description;

graphically displaying an action bar based on the user interface description transmitted to a general user interface and prior to any subsequent interaction with a human user; and responding to the human user.

* * * * *